United States Patent
Borzycki et al.

(10) Patent No.: US 10,089,458 B2
(45) Date of Patent: Oct. 2, 2018

(54) SEPARATE, DISPOSABLE EXECUTION ENVIRONMENT FOR ACCESSING UNVERIFIED CONTENT

(71) Applicant: Citrix Systems, Inc., Ft. Lauderdale, FL (US)

(72) Inventors: Andrew Borzycki, Killara (AU); Mallikharjuna Reddy Deva, Sydney (AU); Richard Croft, Sydney (AU); Hao Wang, Sydney (AU)

(73) Assignee: Citrix Systems, Inc., Fort Lauderdale, FL (US)

( * ) Notice: Subject to any disclaimer, the term of this patent is extended or adjusted under 35 U.S.C. 154(b) by 346 days.

(21) Appl. No.: 14/037,634

(22) Filed: Sep. 26, 2013

(65) Prior Publication Data

US 2015/0089497 A1   Mar. 26, 2015

(51) Int. Cl.
*G06F 21/53* (2013.01)
*G06F 9/455* (2018.01)

(52) U.S. Cl.
CPC .......... *G06F 21/53* (2013.01); *G06F 9/45533* (2013.01)

(58) Field of Classification Search
CPC .............................. G06F 9/45533; G06F 21/53
See application file for complete search history.

(56) References Cited

U.S. PATENT DOCUMENTS

| | | | |
|---|---|---|---|
| 7,607,171 B1* | 10/2009 | Marsden et al. | 726/24 |
| 8,321,936 B1* | 11/2012 | Green et al. | 726/23 |
| 8,726,337 B1* | 5/2014 | Curry | H04L 63/20 |
| | | | 713/168 |
| 9,223,962 B1* | 12/2015 | Kashyap | G06F 21/566 |
| 2007/0171921 A1* | 7/2007 | Wookey et al. | 370/401 |
| 2009/0222922 A1* | 9/2009 | Sidiroglou et al. | 726/23 |
| 2012/0054829 A1* | 3/2012 | Holostov | G06F 21/53 |
| | | | 726/3 |
| 2013/0055256 A1 | 2/2013 | Banga et al. | |
| 2013/0091543 A1 | 4/2013 | Wade et al. | |

(Continued)

FOREIGN PATENT DOCUMENTS

EP   2369479 A2   9/2011

OTHER PUBLICATIONS

PCT International Search Report, International Application No. PCT/US2014/042507, dated Sep. 3, 2014, 10 pages.

(Continued)

*Primary Examiner* — Jacob D Dascomb
(74) *Attorney, Agent, or Firm* — Banner & Witcoff, Ltd.

(57) ABSTRACT

Methods and systems are disclosed for opening unverified content in a separate, disposable virtualized environment using a temporary virtual machine (VM). In one example, the disclosed method includes intercepting a request to open/access unverified content from a third-party remote server, and comparing the particular information/attributes of the unverified content against predetermined criteria. Then, the user device may connect using a remote presentation protocol to the temporary VM in the separate, disposable environment such that the output of the unverified content may be transported to and displayed in the separate, disposable environment. The connection with the temporary VM may be terminated and the separate, disposable environment may be wiped clean to reduce the risk of malicious code in the unverified content.

19 Claims, 8 Drawing Sheets

(56) References Cited

U.S. PATENT DOCUMENTS

| | | | | |
|---|---|---|---|---|
| 2013/0332846 A1* | 12/2013 | Freedman | ............. | H01B 7/292 |
| | | | | 715/745 |
| 2014/0310807 A1* | 10/2014 | Qi et al. | ........................ | 726/22 |
| 2014/0317617 A1* | 10/2014 | O'Donnell et al. | ............. | 718/1 |
| 2014/0331333 A1* | 11/2014 | Frost | ...................... | G06F 21/62 |
| | | | | 726/28 |
| 2016/0021614 A1* | 1/2016 | Liu | ........................ | H04L 67/26 |
| | | | | 370/311 |

OTHER PUBLICATIONS

Live Attack Visualization and Analysis, What does a Malware attack look like? © 2013 Bromium, Inc., pp. 1-11.
Bromium Releases vSentry, Adds LAVA-A Realtime Threat Analysis Feature, Gabe Knuth, www.bromium.com/news/bromium-releases-vsentry-adds-lava-realtime-threat-analysis-feature.html, downloaded Sep. 9, 2013, © 2013 Bromium, pp. 1-2.
Innovation: Micro-virtualization, www.bromium.com/innovations/mciro-virtualization.html, downloaded Sep. 9, 2013 © 2013 Bromium, pp. 1-2.
Its Too Late—Malware Has Already Won, by Gaurav Banga, Friday, Jul. 5, 2013, www.cnbc.com/id/100846806/print, downloaded Sep. 9, 2013, © 2013 Bromium, pp. 1-2.
Mandiant APT1 Exposing One of China's Cyber Espionage Units, www.mandiant.com, 76 pages, downloaded Sep. 9, 2013.
Aug. 29, 2017 (EP) Examination Report—App. 14737440.9.

* cited by examiner

SEPARATE, DISPOSABLE EXECUTION ENVIRONMENT FOR ACCESSING UNVERIFIED CONTENT

CROSS-REFERENCE TO OTHER APPLICATIONS

This application is related to U.S. Provisional Patent Application Ser. No. 61/824,204, filed on May 16, 2013, which is herein incorporated by reference in its entirety.

This application is related to U.S. Provisional Patent Application Ser. No. 61/712,962, filed on Oct. 12, 2012, which is herein incorporated by reference in its entirety.

TECHNICAL FIELD

Aspects described herein generally relate to electronic communications over computer networks. Aspects described herein also relate to opening unverified content in a separate, disposable virtualized environment using a temporary virtual machine.

BACKGROUND

Traditionally, personal computers included operating systems, applications, and user settings for a single user. Personal computers were generally both used and managed by their owners. However, many organizations are now using virtualization, remote access and/or clouds of computing resources to fulfill their computing needs. Clouds of virtualized computing resources generally allow for the operating systems, applications, and user settings of multiple users to be included on a single physical machine. Desktop virtualization technology allows multiple instances of an operating system to be kept separate, so the activity of one user does not affect the experience of other users. Cloud computing environments allow for computers owned by the cloud operator to be managed by the cloud operator but used by cloud users, who may be customers of the cloud operator.

In addition, in a virtualization, remote access environment, virtual machine client agent applications may be used. Virtual machine client agent applications are applications that allow a user a type of virtualized remote access to corporate applications, desktops and data, even when said "remote" resources are on the physical machine the user may be using. Each receiver may communicate with a central enterprise server that lists which applications and other resource have been selected by the user, and which applications and other resources are available for the user to select or request. Moreover, while cross device sharing frameworks, such as that offered by GOOGLE CHROME, AIRPLAY and MICROSOFT XBOX SMART GLASS, exist, these frameworks are deficient in providing security or protection against malware.

Meanwhile, sandbox technologies exist, including APPLE iOS, ANDROID, BROMIUM, and APP-V. These existing sandbox technologies operate within one device, thus if the sandbox is compromised, e.g., intentionally through jailbreaking or otherwise, the security of a user device may be compromised. The existing technologies leave much to be desired in the way of security against malware and security threats to a user device.

SUMMARY

The following presents a simplified summary of various aspects described herein. This summary is not an extensive overview, and is not intended to identify key or critical elements or to delineate the scope of the claims. The following summary merely presents some concepts in a simplified form as an introductory prelude to the more detailed description provided below.

To overcome limitations in the prior art described above, and to overcome other limitations that will be apparent upon reading and understanding the present specification, aspects described herein are directed towards a method including: receiving a request to open unverified content from a remote server; determining, by an application resolver without user intervention, that the unverified content is designated for opening in a disposable environment; causing the unverified content to be uploaded to a cloud file storage; automatically instructing a virtualization server to provision a temporary virtual machine in the disposable environment to open the content uploaded into the cloud file storage; receiving a confirmation from the virtualization server that the temporary virtual machine in the disposable environment is ready to connect; launching a client agent configured to communicate using at least a remote presentation protocol with the temporary virtual machine associated with the virtualization server; connecting, using the client agent, to the temporary virtual machine in the disposable environment; displaying an output resulting from opening of the unverified content at the temporary virtual machine in the disposable environment; and terminating the connection with the temporary virtual machine in the disposable environment.

In some examples, an application resolver may reside on a user device physically separate from the virtualization server, and the application resolver may be registered as a handler for the unverified content that meets particular criterion such that the application resolver intercepts requests received on the user device to open the unverified content that meets the particular criterion.

In addition, in some examples, after terminating the connection with the temporary virtual machine, the virtualization server may destroy the disposable environment comprising the temporary virtual machine. However, in some examples, before destroying the disposable environment comprising the temporary virtual machine, an image of the disposable environment may be captured, then compared to an original image of the disposable environment before the malicious code was opened in the disposable environment, and information generated based on the comparison may be optionally transmitted to a third-party database.

Furthermore, aspects may take the form of a computer program product stored by one or more non-transitory, tangible computer-readable storage media having computer-readable program code, or instructions, embodied in or on the storage media. For example, in one example, a non-transitory computer-readable medium may store computer-executable instructions, which when executed by a computer processor, cause a computerized system to perform one or more of the following: intercept, by an application resolver (wherein the application resolver may reside on a user device physically separate from the virtualization server) of a user device, an incoming request to open unverified content from a remote server; compare, by the application resolver, particular information of the unverified content against predetermined criterion to determine that the unverified content will be launched by a temporary virtual machine in a separate disposable environment, wherein the unverified content comprises malicious code that will compromise security of the user device when the malicious code is opened, and wherein the temporary virtual machine was provisioned by a virtualization server; connect, by a client agent of a user device configured to communicate using at least a remote presentation protocol, with the temporary virtual machine in the separate disposable environment; cause the unverified content to be opened by the temporary virtual machine in the separate disposable environment; display, by the user device, an output resulting from opening of the unverified content at the temporary virtual machine in the separate disposable environment; and/or terminate the connection with the temporary virtual machine in the separate disposable environment. In addition, the computer-executable instructions, which when executed by a computer processor, cause a computerized system to perform one or more of the following: infect, by the malicious code opened by the temporary virtual machine, the separate, disposable environment; and after the terminating the connection with the temporary virtual machine, destroy, by the virtualization server, the separate disposable environment comprising the temporary virtual machine.

In addition, in some examples, aspects of the disclosure may include a system comprising a network interface, computer processor, and a tangible computer memory storing computer-executable instructions that, when executed by the computer processor, cause the system to perform one or more of the following: receive a request to open unverified content; cause the unverified content to be downloaded to the computer memory; instruct, by an orchestration service module, the provisioning of a temporary virtual machine in a disposable environment to open the downloaded unverified content, wherein the disposable environment is physically separate from an application resolver residing on a user device (e.g., smartphone, tablet, notebook, and/or laptop); send a confirmation to the user device that the temporary virtual machine in the disposable environment is ready to connect; connect the temporary virtual machine in the disposable environment through a network interface using at least a remote presentation protocol to a client agent in the user device; open the downloaded unverified content in the temporary virtual machine in the disposable environment; send an output resulting from opening of the downloaded unverified content at the temporary virtual machine in the disposable environment to the user device; terminate the connection with the client agent in the user device, including causing the temporary virtual machine to be destroyed; and/or delete the downloaded unverified content in the cloud file storage.

These and additional aspects will be appreciated with the benefit of the disclosures discussed in further detail below.

BRIEF DESCRIPTION OF THE DRAWINGS

A more complete understanding of aspects described herein and the advantages thereof may be acquired by referring to the following description in consideration of the accompanying drawings, in which like reference numbers indicate like features, and wherein.

DETAILED DESCRIPTION

In the following description of the various embodiments, reference is made to the accompanying drawings identified above and which form a part hereof, and in which is shown by way of illustration various embodiments in which aspects described herein may be practiced. It is to be understood that other embodiments may be utilized and structural and functional modifications may be made without departing from the scope described herein. Various aspects are capable of other embodiments and of being practiced or being carried out in various different ways.

Methods and systems are disclosed for opening unverified content in a separate, disposable virtualized environment using a temporary virtual machine (VM). In one example, the disclosed method includes intercepting a request to open/access unverified content from a third-party remote server, and comparing the particular information/attributes of the unverified content against predetermined criteria. Then, the user device may connect using a remote presentation protocol to the temporary VM in the separate, disposable environment such that the output of the unverified content may be displayed in the separate, disposable environment. The connection with the temporary VM may be terminated, and the separate, disposable environment may be wiped clean to reduce the risk of malicious code in the unverified content.

It is to be understood that the phraseology and terminology used herein are for the purpose of description and should not be regarded as limiting. Rather, the phrases and terms used herein are to be given their broadest interpretation and meaning. The use of "including" and "comprising" and variations thereof is meant to encompass the items listed thereafter and equivalents thereof as well as additional items and equivalents thereof The use of the terms "mounted," "connected," "coupled," "positioned," "engaged" and similar terms, is meant to include both direct and indirect mounting, connecting, coupling, positioning and engaging.

Computing Architecture

Figure 1:
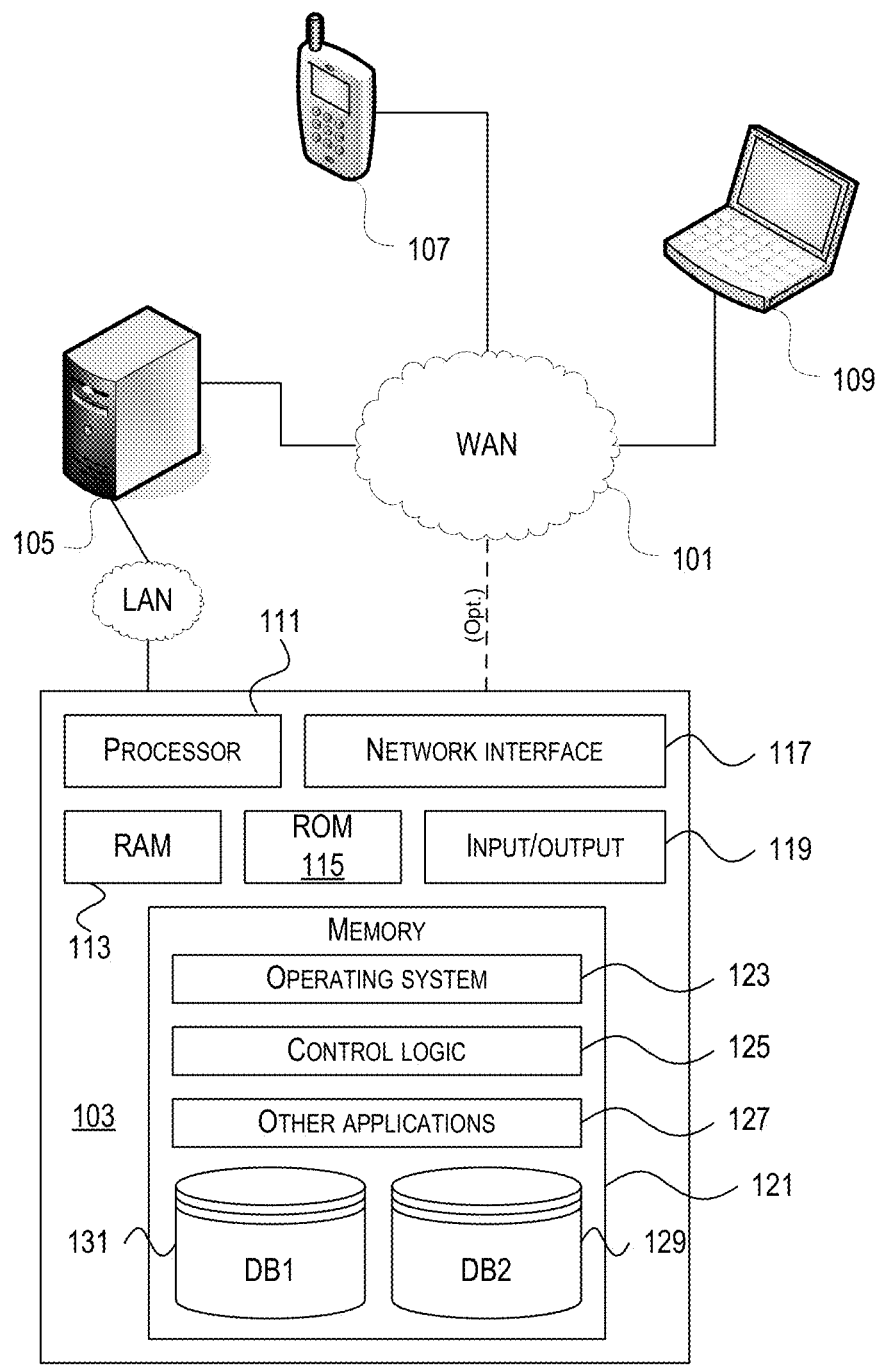
FIG. 1 depicts an illustrative computer system architecture that may be used in accordance with one or more illustrative aspects described herein.

Computer software, hardware, and networks may be utilized in a variety of different system environments, including standalone, networked, remote-access (aka, remote desktop), virtualized, and/or cloud-based environments, among others. FIG. 1 illustrates one example of a system architecture and data processing device that may be used to implement one or more illustrative aspects described herein in a standalone and/or networked environment. Various network nodes 103, 105, 107, and 109 may be interconnected via a wide area network (WAN) 101, such as the Internet. Other networks may also or alternatively be used, including private intranets, corporate networks, local area networks (LANs), metropolitan area networks (MAN), wireless networks, personal networks (PAN), and the like. Network 101 is for illustration purposes and may be replaced with fewer or additional computer networks. A LAN may have one or more of any known LAN topology and may use one or more of a variety of different protocols, such as Ethernet. Devices 103, 105, 107, 109 and other devices (not shown) may be connected to one or more of the networks via twisted pair wires, coaxial cable, fiber optics, radio waves or other communication media.

The term "network" as used herein and depicted in the drawings refers not only to systems in which remote storage devices are coupled together via one or more communication paths, but also to stand-alone devices that may be coupled, from time to time, to such systems that have storage capability. Consequently, the term "network" includes not only a "physical network" but also a "content network," which is comprised of the data—attributable to a single entity—which resides across all physical networks.

The components may include data server 103, web server 105, and client computers 107, 109. Data server 103 provides overall access, control and administration of databases and control software for performing one or more illustrative aspects describe herein. Data server 103 may be connected to web server 105 through which users interact with and obtain data as requested. Alternatively, data server 103 may act as a web server itself and be directly connected to the Internet. Data server 103 may be connected to web server 105 through the network 101 (e.g., the Internet), via direct or indirect connection, or via some other network. Users may interact with the data server 103 using remote computers 107, 109, e.g., using a web browser to connect to the data server 103 via one or more externally exposed web sites hosted by web server 105. Client computers 107, 109 may be used in concert with data server 103 to access data stored therein, or may be used for other purposes. For example, from client device 107 a user may access web server 105 using an Internet browser, as is known in the art, or by executing a software application that communicates with web server 105 and/or data server 103 over a computer network (such as the Internet).

Servers and applications may be combined on the same physical machines, and retain separate virtual or logical addresses, or may reside on separate physical machines. FIG. 1 illustrates just one example of a network architecture that may be used, and those of skill in the art will appreciate that the specific network architecture and data processing devices used may vary, and are secondary to the functionality that they provide, as further described herein. For example, services provided by web server 105 and data server 103 may be combined on a single server.

Each component 103, 105, 107, 109 may be any type of known computer, server, or data processing device. Data server 103, e.g., may include a processor 111 controlling overall operation of the rate server 103. Data server 103 may further include RAM 113, ROM 115, network interface 117, input/output interfaces 119 (e.g., keyboard, mouse, display, printer, etc.), and memory 121. I/O 119 may include a variety of interface units and drives for reading, writing, displaying, and/or printing data or files. Memory 121 may further store operating system software 123 for controlling overall operation of the data processing device 103, control logic 125 for instructing data server 103 to perform aspects described herein, and other application software 127 providing secondary, support, and/or other functionality which may or may not be used in conjunction with aspects described herein. The control logic may also be referred to herein as the data server software 125. Functionality of the data server software may refer to operations or decisions made automatically based on rules coded into the control logic, made manually by a user providing input into the system, and/or a combination of automatic processing based on user input (e.g., queries, data updates, etc.).

Memory 121 may also store data used in performance of one or more aspects described herein, including a first database 129 and a second database 131. In some embodiments, the first database may include the second database (e.g., as a separate table, report, etc.). That is, the information can be stored in a single database, or separated into different logical, virtual, or physical databases, depending on system design. Devices 105, 107, 109 may have similar or different architecture as described with respect to device 103. Those of skill in the art will appreciate that the functionality of data processing device 103 (or device 105, 107, 109) as described herein may be spread across multiple data processing devices, for example, to distribute processing load across multiple computers, to segregate transactions based on geographic location, user access level, quality of service (QoS), etc.

One or more aspects may be embodied in computer-usable or readable data and/or computer-executable instructions, such as in one or more program modules, executed by one or more computers or other devices as described herein. Generally, program modules include routines, programs, objects, components, data structures, etc. that perform particular tasks or implement particular abstract data types when executed by a processor in a computer or other device. The modules may be written in a source code programming language that is subsequently compiled for execution, such as C++, C# or Java, or may be written in a scripting language such as (but not limited to) Javascript or ActionScript. The computer executable instructions may be stored on a computer readable medium such as a nonvolatile storage device. Any suitable computer readable storage media may be utilized, including hard disks, CD-ROMs, optical storage devices, magnetic storage devices, and/or any combination thereof In addition, various transmission (non-storage) media representing data or events as described herein may be transferred between a source and a destination in the form of electromagnetic waves traveling through signal-conducting media such as metal wires, optical fibers, and/or wireless transmission media (e.g., air and/or space). Various aspects described herein may be embodied as a method, a data processing system, or a computer program product. Therefore, various functionalities may be embodied in whole or in part in software, firmware and/or hardware or hardware equivalents such as integrated circuits, field programmable gate arrays (FPGA), and the like. Particular data structures may be used to more effectively implement one or more aspects described herein, and such data structures are contemplated within the scope of computer executable instructions and computer-usable data described herein.

Figure 2:
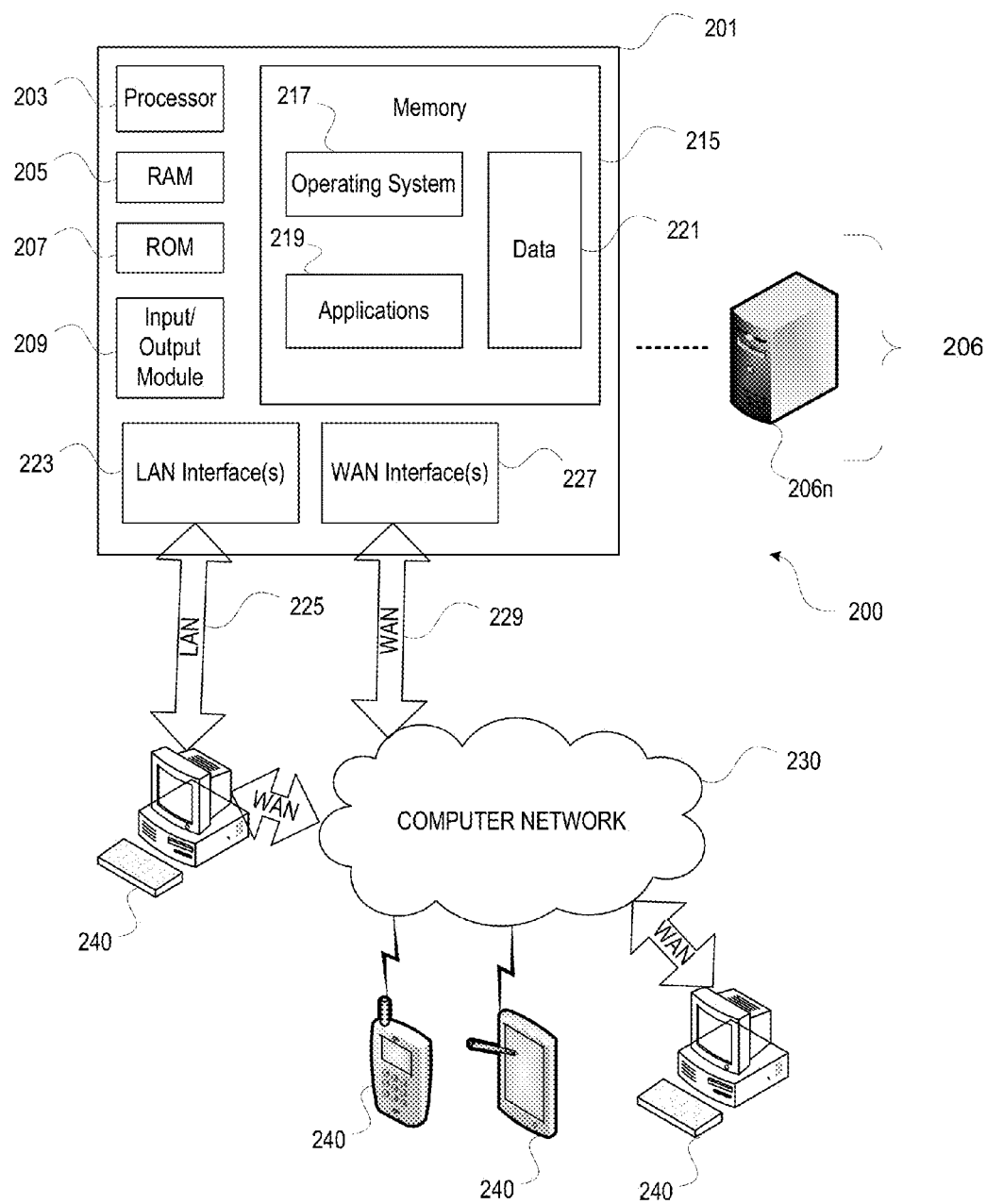
FIG. 2 depicts an illustrative remote-access system architecture that may be used in accordance with one or more illustrative aspects described herein.

With further reference to FIG. 2, one or more aspects described herein may be implemented in a remote-access environment. FIG. 2 depicts an example system architecture including a generic computing device 201 in an illustrative computing environment 200 that may be used according to one or more illustrative aspects described herein. Generic computing device 201 may be used as a server 206a in a single-server or multi-server desktop virtualization system (e.g., a remote access or cloud system) configured to provide virtual machines for client access devices. The generic computing device 201 may have a processor 203 for controlling overall operation of the server and its associated components, including random access memory (RAM) 205, read-only memory (ROM) 207, input/output (I/O) module 209, and memory 215.

I/O module 209 may include a mouse, keypad, touch screen, scanner, optical reader, and/or stylus (or other input device(s)) through which a user of generic computing device 201 may provide input, and may also include one or more of a speaker for providing audio output and a video display device for providing textual, audiovisual, and/or graphical output. Software may be stored within memory 215 and/or other storage to provide instructions to processor 203 for configuring generic computing device 201 into a special purpose computing device in order to perform various functions as described herein. For example, memory 215 may store software used by the computing device 201, such as an operating system 217, application programs 219, and an associated database 221. Alternatively, some or all of the computer executable instructions for generic computing device 201 may be embodied in hardware or firmware (not shown).

Computing device 201 may operate in a networked environment supporting connections to one or more remote computers, such as terminals 240 (also referred to as client devices). The terminals 240 may be personal computers, mobile devices, laptop computers, tablets, or servers that include many or all of the elements described above with respect to the generic computing device 103 or 201. The network connections depicted in FIG. 2 include a local area network (LAN) 225 and a wide area network (WAN) 229, but may also include other networks or networks comprising sub-networks. In some embodiments, the network 230 may include a metropolitan area network (MAN); a wide area network (WAN); a primary network 104 comprised of multiple sub-networks located between the client machines 140 and the servers 106; a primary public network 230 (e.g., the Internet) with a private sub-network; a primary private network 230 with a public sub-network; or a primary private network 230 with a private sub-network. Still further embodiments may include a network 230 that can be any of the following network types: a point-to-point network; a broadcast network; a telecommunications network; a data communication network; a computer network; an ATM (Asynchronous Transfer Mode) network; a SONET (Synchronous Optical Network) network; a SDH (Synchronous Digital Hierarchy) network; a wireless network; a wireline network; or a network that includes a wireless link where the wireless link can include an infrared channel and/or satellite band. The network topology of the network 230 can differ within different embodiments, possible network topologies include but are not limited to: a bus network topology; a star network topology; a ring network topology; a repeater-based network topology; or a tiered-star network topology. Additional embodiments may include a network of mobile telephone networks that use a protocol to communicate among mobile devices, where the protocol may include, but is not limited to: AMPS; TDMA; CDMA; GSM; GPRS UMTS; 4G; LTE; or any other protocol able to transmit data among mobile devices.

When used in a LAN networking environment, computing device 201 may be connected to the LAN 225 through a network interface or adapter 223. When used in a WAN networking environment, computing device 201 may include a modem 227 or other wide area network interface for establishing communications over the WAN 229, such as computer network 230 (e.g., the Internet). It will be appreciated that the network connections shown are illustrative and other means of establishing a communications link between the computers may be used. Computing device 201 and/or terminals 240 may also be mobile terminals (e.g., mobile phones, smartphones, tablets, PDAs, notebooks, laptops, etc.) including various other components, such as a battery, speaker, and antennas (not shown).

Aspects described herein may also be operational with numerous other general purpose or special purpose computing system environments or configurations. Examples of other computing systems, environments, and/or configurations that may be suitable for use with aspects described herein include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

As shown in FIG. 2, one or more client devices 240 may be in communication with one or more servers 206a-206n (generally referred to herein as "server(s) 206"). In one embodiment, the computing environment 200 may include a network appliance installed between the server(s) 206 and client machine(s) 240. The network appliance may manage client/server connections, and in some cases can load balance client connections amongst a plurality of backend servers 206.

The client machine(s) 240 may in some embodiments be referred to as a single client machine 240 or a single group of client machines 240, while server(s) 206 may be referred to as a single server 206 or a single group of servers 206. In one embodiment a single client machine 240 communicates with more than one server 206, while in another embodiment a single server 206 communicates with more than one client machine 240. In yet another embodiment, a single client machine 240 communicates with a single server 206.

A client machine 240 can, in some embodiments, be referenced by any one of the following non-exhaustive terms: client machine(s); client(s); client computer(s); client device(s); client computing device(s); local machine; remote machine; client node(s); endpoint(s); or endpoint node(s). The server 206, in some embodiments, may be referenced by any one of the following non-exhaustive terms: server(s), local machine; remote machine; server farm(s), or host computing device(s).

In one embodiment, the client machine 240 may be a virtual machine. The virtual machine may be any virtual machine, while in some embodiments the virtual machine may be any virtual machine managed by a Type 1 or Type 2 hypervisor, for example, a hypervisor developed by Citrix Systems, IBM, VMware, or any other hypervisor. In some aspects, the virtual machine may be managed by a hypervisor, while in aspects the virtual machine may be managed by a hypervisor executing on a server 206 or a hypervisor executing on a client 240.

Some embodiments include a client device 240 that displays application output generated by an application remotely executing on a server 206 or other remotely located machine. In these embodiments, the client device 240 may execute a virtual machine client agent program or application to display the output in an application window, a browser, or other output window. In one example, the application is a desktop, while in other examples the application is an application that generates or presents a desktop. A desktop may include a graphical shell providing a user interface for an instance of an operating system in which local and/or remote applications can be integrated. Applications, as used herein, are programs that execute after an instance of an operating system (and, optionally, also the desktop) has been loaded.

The server 206, in some embodiments, uses a remote presentation protocol or other program to send data to a thin-client or remote-display application executing on the client to present display output generated by an application executing on the server 206. The thin-client or remote-display protocol can be any one of the following non-exhaustive list of protocols: the Independent Computing Architecture (ICA) protocol developed by Citrix Systems, Inc. of Ft. Lauderdale, Fla.; or the Remote Desktop Protocol (RDP) manufactured by the Microsoft Corporation of Redmond, Wash.

A remote computing environment may include more than one server 206a-206n such that the servers 206a-206n are logically grouped together into a server farm 206, for example, in a cloud computing environment. The server farm 206 may include servers 206 that are geographically dispersed while and logically grouped together, or servers 206 that are located proximate to each other while logically grouped together. Geographically dispersed servers 206a-206n within a server farm 206 can, in some embodiments, communicate using a WAN (wide), MAN (metropolitan), or LAN (local), where different geographic regions can be characterized as: different continents; different regions of a continent; different countries; different states; different cities; different campuses; different rooms; or any combination of the preceding geographical locations. In some embodiments the server farm 206 may be administered as a single entity, while in other embodiments the server farm 206 can include multiple server farms.

In some embodiments, a server farm may include servers 206 that execute a substantially similar type of operating system platform (e.g., WINDOWS, UNIX, LINUX, iOS, ANDROID, SYMBIAN, etc.) In other embodiments, server farm 206 may include a first group of one or more servers that execute a first type of operating system platform, and a second group of one or more servers that execute a second type of operating system platform.

Server 206 may be configured as any type of server, as needed, e.g., a file server, an application server, a web server, a proxy server, an appliance, a network appliance, a gateway, an application gateway, a gateway server, a virtualization server, a deployment server, a SSL VPN server, a firewall, a web server, an application server or as a master application server, a server executing an active directory, or a server executing an application acceleration program that provides firewall functionality, application functionality, or load balancing functionality. Other server types may also be used.

Some embodiments include a first server 206a that receives requests from a client machine 240, forwards the request to a second server 206b, and responds to the request generated by the client machine 240 with a response from the second server 206b. First server 206a may acquire an enumeration of applications available to the client machine 240 and well as address information associated with an application server 206 hosting an application identified within the enumeration of applications. First server 206a can then present a response to the client's request using a web interface, and communicate directly with the client 240 to provide the client 240 with access to an identified application. One or more clients 240 and/or one or more servers 206 may transmit data over network 230, e.g., network 101.

FIG. 2 shows a high-level architecture of an illustrative desktop virtualization system. As shown, the desktop virtualization system may be single-server or multi-server system, or cloud system, including at least one virtualization server 206 configured to provide virtual desktops and/or virtual applications to one or more client access devices 240. As used herein, a desktop refers to a graphical environment or space in which one or more applications may be hosted and/or executed. A desktop may include a graphical shell providing a user interface for an instance of an operating system in which local and/or remote applications can be integrated. Applications may include programs that execute after an instance of an operating system (and, optionally, also the desktop) has been loaded. Each instance of the operating system may be physical (e.g., one operating system per device) or virtual (e.g., many instances of an OS running on a single device). Each application may be executed on a local device, or executed on a remotely located device (e.g., remoted).

Figure 3:
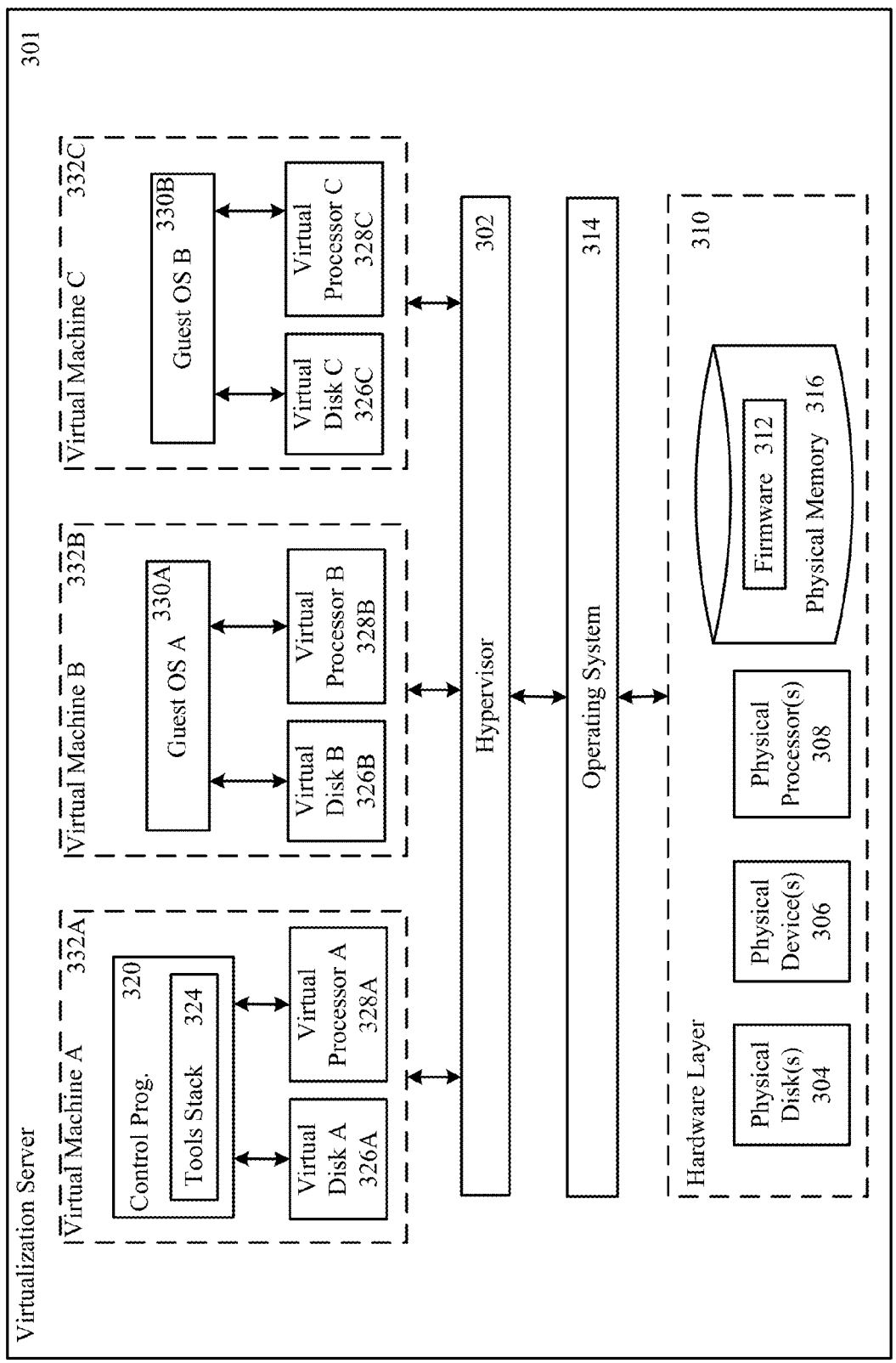
FIG. 3 depicts an illustrative virtualized (hypervisor) system architecture that may be used in accordance with one or more illustrative aspects described herein.

With further reference to FIG. 3, a computer device 301 may be configured as a virtualization server in a virtualization environment, for example, a single-server, multi-server, or cloud computing environment. Virtualization server 301 illustrated in FIG. 3 can be deployed as and/or implemented by one or more embodiments of the server 206 illustrated in FIG. 2 or by other known computing devices. Included in virtualization server 301 is a hardware layer that can include one or more physical disks 304, one or more physical devices 306, one or more physical processors 308 and one or more physical memories 316. In some embodiments, firmware 312 can be stored within a memory element in the physical memory 316 and can be executed by one or more of the physical processors 308. Virtualization server 301 may further include an operating system 314 that may be stored in a memory element in the physical memory 316 and executed by one or more of the physical processors 308. Still further, a hypervisor 302 may be stored in a memory element in the physical memory 316 and can be executed by one or more of the physical processors 308.

Executing on one or more of the physical processors 308 may be one or more virtual machines 332A-C (generally 332). Each virtual machine 332 may have a virtual disk 326A-C and a virtual processor 328A-C. In some embodiments, a first virtual machine 332A may execute, using a virtual processor 328A, a control program 320 that includes a tools stack 324. Control program 320 may be referred to as a control virtual machine, Dom0, Domain 0, or other virtual machine used for system administration and/or control. In some embodiments, one or more virtual machines 332B-C can execute, using a virtual processor 328B-C, a guest operating system 330A-B.

Virtualization server 301 may include a hardware layer 310 with one or more pieces of hardware that communicate with the virtualization server 301. In some embodiments, the hardware layer 310 can include one or more physical disks 304, one or more physical devices 306, one or more physical processors 308, and one or more memory 216. Physical components 304, 306, 308, and 316 may include, for example, any of the components described above. Physical devices 306 may include, for example, a network interface card, a video card, a keyboard, a mouse, an input device, a monitor, a display device, speakers, an optical drive, a storage device, a universal serial bus connection, a printer, a scanner, a network element (e.g., router, firewall, network address translator, load balancer, virtual private network (VPN) gateway, Dynamic Host Configuration Protocol (DHCP) router, etc.), or any device connected to or communicating with virtualization server 301. Physical memory 316 in the hardware layer 310 may include any type of memory. Physical memory 316 may store data, and in some embodiments may store one or more programs, or set of executable instructions. FIG. 3 illustrates an embodiment where firmware 312 is stored within the physical memory 316 of virtualization server 301. Programs or executable instructions stored in the physical memory 316 can be executed by the one or more processors 308 of virtualization server 301.

Virtualization server 301 may also include a hypervisor 302. In some embodiments, hypervisor 302 may be a program executed by processors 308 on virtualization server 301 to create and manage any number of virtual machines 332. Hypervisor 302 may be referred to as a virtual machine monitor, or platform virtualization software. In some embodiments, hypervisor 302 can be any combination of executable instructions and hardware that monitors virtual machines executing on a computing machine. Hypervisor 302 may be Type 2 hypervisor, where the hypervisor that executes within an operating system 314 executing on the virtualization server 301. Virtual machines then execute at a level above the hypervisor. In some embodiments, the Type 2 hypervisor executes within the context of a user's operating system such that the Type 2 hypervisor interacts with the user's operating system. In other embodiments, one or more virtualization servers 201 in a virtualization environment may instead include a Type 1 hypervisor (Not Shown). A Type 1 hypervisor may execute on the virtualization server 301 by directly accessing the hardware and resources within the hardware layer 310. That is, while a Type 2 hypervisor 302 accesses system resources through a host operating system 314, as shown, a Type 1 hypervisor may directly access all system resources without the host operating system 314. A Type 1 hypervisor may execute directly on one or more physical processors 308 of virtualization server 301, and may include program data stored in the physical memory 316.

Hypervisor 302, in some embodiments, can provide virtual resources to operating systems 330 or control programs 320 executing on virtual machines 332 in any manner that simulates the operating systems 330 or control programs 320 having direct access to system resources. System resources can include, but are not limited to, physical devices 306, physical disks 304, physical processors 308, physical memory 316 and any other component included in virtualization server 301 hardware layer 310. Hypervisor 302 may be used to emulate virtual hardware, partition physical hardware, virtualize physical hardware, and/or execute virtual machines that provide access to computing environments. In still other embodiments, hypervisor 302 controls processor scheduling and memory partitioning for a virtual machine 332 executing on virtualization server 301. Hypervisor 302 may include those manufactured by VMWare, Inc., of Palo Alto, Calif.; the XEN hypervisor, an open source product whose development is overseen by the open source Xen.org community; HyperV, VirtualServer or virtual PC hypervisors provided by Microsoft, or others. In some embodiments, virtualization server 301 executes a hypervisor 302 that creates a virtual machine platform on which guest operating systems may execute. In these embodiments, the virtualization server 301 may be referred to as a host server. An example of such a virtualization server is the XEN SERVER provided by Citrix Systems, Inc., of Fort Lauderdale, Fla.

Hypervisor 302 may create one or more virtual machines 332B-C (generally 332) in which guest operating systems 330 execute. In some embodiments, hypervisor 302 may load a virtual machine image to create a virtual machine 332. In other embodiments, the hypervisor 302 may executes a guest operating system 330 within virtual machine 332. In still other embodiments, virtual machine 332 may execute guest operating system 330.

In addition to creating virtual machines 332, hypervisor 302 may control the execution of at least one virtual machine 332. In other embodiments, hypervisor 302 may presents at least one virtual machine 332 with an abstraction of at least one hardware resource provided by the virtualization server 301 (e.g., any hardware resource available within the hardware layer 310). In other embodiments, hypervisor 302 may control the manner in which virtual machines 332 access physical processors 308 available in virtualization server 301. Controlling access to physical processors 308 may include determining whether a virtual machine 332 should have access to a processor 308, and how physical processor capabilities are presented to the virtual machine 332.

As shown in FIG. 3, virtualization server 301 may host or execute one or more virtual machines 332. A virtual machine 332 is a set of executable instructions that, when executed by a processor 308, imitate the operation of a physical computer such that the virtual machine 332 can execute programs and processes much like a physical computing device. While FIG. 3 illustrates an embodiment where a virtualization server 301 hosts three virtual machines 332, in other embodiments virtualization server 301 can host any number of virtual machines 332. Hypervisor 302, in some embodiments, provides each virtual machine 332 with a unique virtual view of the physical hardware, memory, processor and other system resources available to that virtual machine 332. In some embodiments, the unique virtual view can be based on one or more of virtual machine permissions, application of a policy engine to one or more virtual machine identifiers, a user accessing a virtual machine, the applications executing on a virtual machine, networks accessed by a virtual machine, or any other desired criteria. For instance, hypervisor 302 may create one or more unsecure virtual machines 332 and one or more secure virtual machines 332. Unsecure virtual machines 332 may be prevented from accessing resources, hardware, memory locations, and programs that secure virtual machines 332 may be permitted to access. In other embodiments, hypervisor 302 may provide each virtual machine 332 with a substantially similar virtual view of the physical hardware, memory, processor and other system resources available to the virtual machines 332.

Each virtual machine 332 may include a virtual disk 326A-C (generally 326) and a virtual processor 328A-C (generally 328.) The virtual disk 326, in some embodiments, is a virtualized view of one or more physical disks 304 of the virtualization server 301, or a portion of one or more physical disks 304 of the virtualization server 301. The virtualized view of the physical disks 304 can be generated, provided and managed by the hypervisor 302. In some embodiments, hypervisor 302 provides each virtual machine 332 with a unique view of the physical disks 304. Thus, in these embodiments, the particular virtual disk 326 included in each virtual machine 332 can be unique when compared with the other virtual disks 326.

A virtual processor 328 can be a virtualized view of one or more physical processors 308 of the virtualization server 301. In some embodiments, the virtualized view of the physical processors 308 can be generated, provided and managed by hypervisor 302. In some embodiments, virtual processor 328 has substantially all of the same characteristics of at least one physical processor 308. In other embodiments, virtual processor 308 provides a modified view of physical processors 308 such that at least some of the characteristics of the virtual processor 328 are different than the characteristics of the corresponding physical processor 308.

Figure 4:
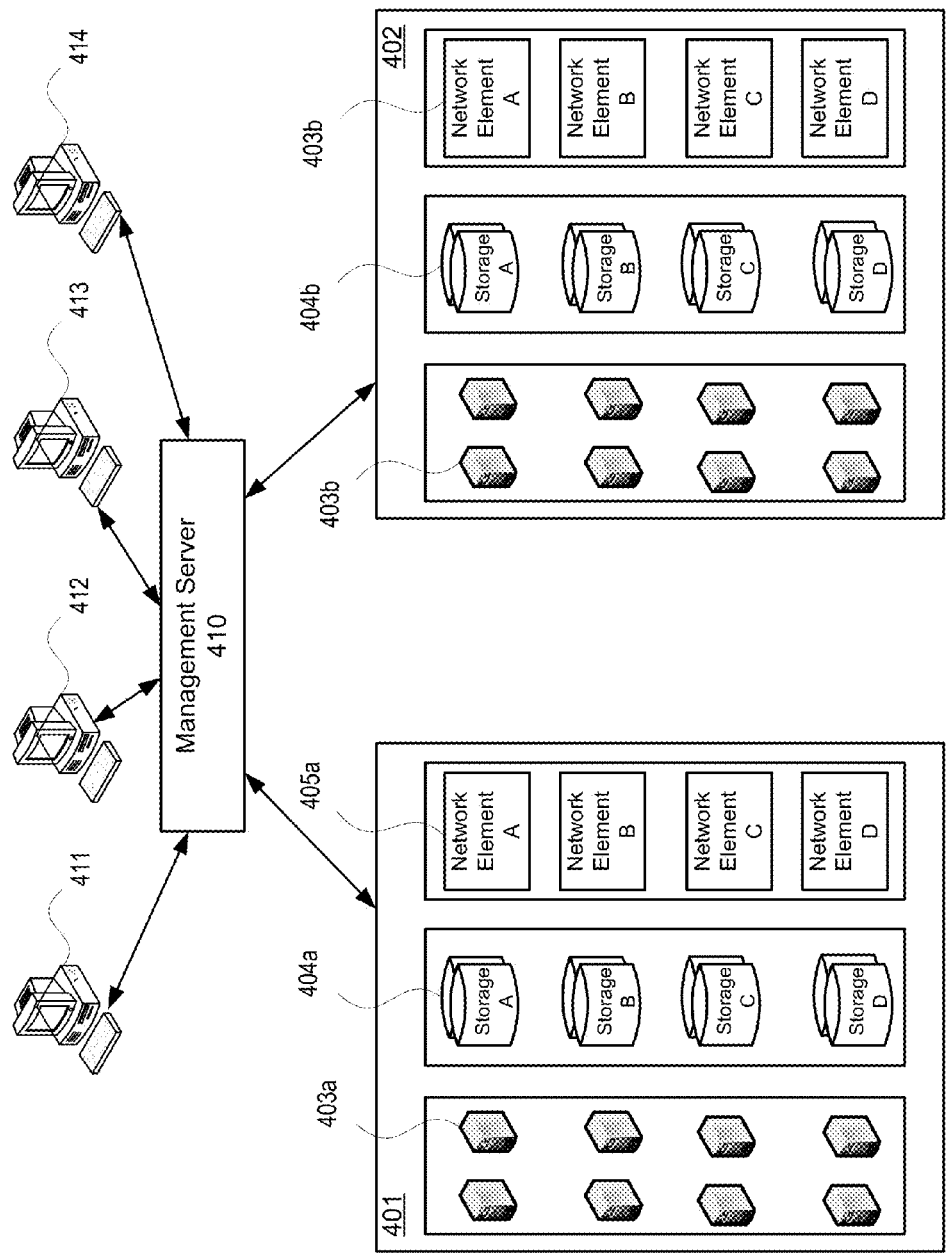
FIG. 4 depicts an illustrative cloud-based system architecture that may be used in accordance with one or more illustrative aspects described herein.

With further reference to FIG. 4, some aspects described herein may be implemented in a cloud-based environment. FIG. 4 illustrates an example of a cloud computing environment (or cloud system) 400. As seen in FIG. 4, client computers 411-414 may communicate with a cloud management server 410 to access the computing resources (e.g., host servers 403, storage resources 404, and network resources 405) of the cloud system.

Management server 410 may be implemented on one or more physical servers. The management server 410 may run, for example, CLOUDSTACK by Citrix Systems, Inc. of Ft. Lauderdale, Fla., or OPENSTACK, among others. Management server 410 may manage various computing resources, including cloud hardware and software resources, for example, host computers 403, data storage devices 404, and networking devices 405. The cloud hardware and software resources may include private and/or public components. For example, a cloud may be configured as a private cloud to be used by one or more particular customers or client computers 411-414 and/or over a private network. In other embodiments, public clouds or hybrid public-private clouds may be used by other customers over an open or hybrid networks.

Management server 410 may be configured to provide user interfaces through which cloud operators and cloud customers may interact with the cloud system. For example, the management server 410 may provide a set of APIs and/or one or more cloud operator console applications (e.g., web-based or standalone applications) with user interfaces to allow cloud operators to manage the cloud resources, configure the virtualization layer, manage customer accounts, and perform other cloud administration tasks. The management server 410 also may include a set of APIs and/or one or more customer console applications with user interfaces configured to receive cloud computing requests from end users via client computers 411-414, for example, requests to create, modify, or destroy virtual machines within the cloud. Client computers 411-414 may connect to management server 410 via the Internet or other communication network, and may request access to one or more of the computing resources managed by management server 410. In response to client requests, the management server 410 may include a resource manager configured to select and provision physical resources in the hardware layer of the cloud system based on the client requests. For example, the management server 410 and additional components of the cloud system may be configured to provision, create, and manage virtual machines and their operating environments (e.g., hypervisors, storage resources, services offered by the network elements, etc.) for customers at client computers 411-414, over a network (e.g., the Internet), providing customers with computational resources, data storage services, networking capabilities, and computer platform and application support. Cloud systems also may be configured to provide various specific services, including security systems, development environments, user interfaces, and the like.

Certain clients 411-414 may be related, for example, different client computers creating virtual machines on behalf of the same end user, or different users affiliated with the same company or organization. In other examples, certain clients 411-414 may be unrelated, such as users affiliated with different companies or organizations. For unrelated clients, information on the virtual machines or storage of any one user may be hidden from other users.

Referring now to the physical hardware layer of a cloud computing environment, availability zones 401-402 (or zones) may refer to a collocated set of physical computing resources. Zones may be geographically separated from other zones in the overall cloud of computing resources. For example, zone 401 may be a first cloud datacenter located in California, and zone 402 may be a second cloud datacenter located in Florida. Management sever 410 may be located at one of the availability zones, or at a separate location. Each zone may include an internal network that interfaces with devices that are outside of the zone, such as the management server 410, through a gateway. End users of the cloud (e.g., clients 411-414) might or might not be aware of the distinctions between zones. For example, an end user may request the creation of a virtual machine having a specified amount of memory, processing power, and network capabilities. The management server 410 may respond to the user's request and may allocate the resources to create the virtual machine without the user knowing whether the virtual machine was created using resources from zone 401 or zone 402. In other examples, the cloud system may allow end users to request that virtual machines (or other cloud resources) are allocated in a specific zone or on specific resources 403-405 within a zone.

In this example, each zone 401-402 may include an arrangement of various physical hardware components (or computing resources) 403-405, for example, physical hosting resources (or processing resources), physical network resources, physical storage resources, switches, and additional hardware resources that may be used to provide cloud computing services to customers. The physical hosting resources in a cloud zone 401-402 may include one or more computer servers 403, such as the virtualization servers 301 described above, which may be configured to create and host virtual machine instances. The physical network resources in a cloud zone 401 or 402 may include one or more network elements 405 (e.g., network service providers) comprising hardware and/or software configured to provide a network service to cloud customers, such as firewalls, network address translators, load balancers, virtual private network (VPN) gateways, Dynamic Host Configuration Protocol (DHCP) routers, and the like. The storage resources in the cloud zone 401-402 may include storage disks (e.g., solid state drives (SSDs), magnetic hard disks, etc.) and other storage devices.

The example cloud computing environment shown in FIG. 4 also may include a virtualization layer (e.g., as shown in FIGS. 1-3) with additional hardware and/or software resources configured to create and manage virtual machines and provide other services to customers using the physical resources in the cloud. The virtualization layer may include hypervisors, as described above in FIG. 3, along with other components to provide network virtualizations, storage virtualizations, etc. The virtualization layer may be as a separate layer from the physical resource layer, or may share some or all of the same hardware and/or software resources with the physical resource layer. For example, the virtualization layer may include a hypervisor installed in each of the virtualization servers 403 with the physical computing resources. Known cloud systems may alternatively be used, e.g., WINDOWS AZURE (Microsoft Corporation of Redmond Wash.), AMAZON EC2 (Amazon.com Inc. of Seattle, Wash.), IBM BLUE CLOUD (IBM Corporation of Armonk, N.Y.), or others.

Figure 5:
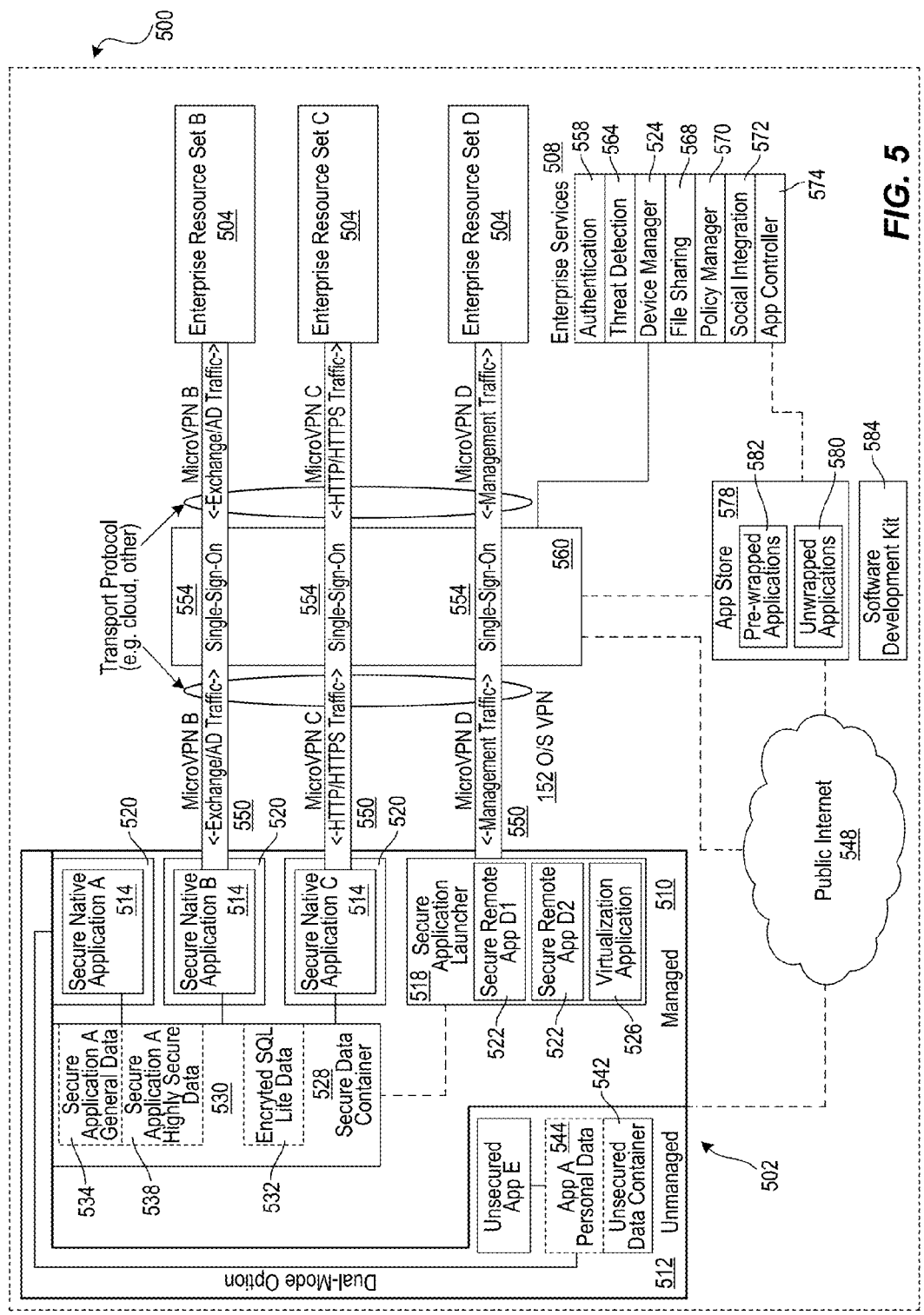
FIG. 5 depicts an illustrative enterprise mobility management system.

FIG. 5 represents an enterprise mobility technical architecture 500 for use in a bring-your-own-device (BYOD) environment. The architecture enables a user of a mobile device 502 (e.g., device 240) to both access enterprise or personal resources from a mobile device 502 and use the mobile device 502 for personal use. The user may access such enterprise resources 504 or enterprise services 508 using a mobile device 502 that is purchased by the user or a mobile device 502 that is provided by the enterprise to the user. The user may utilize the mobile device 502 for business use only or for business and personal use. The mobile device may run an iOS operating system, Android operating system, and/or the like. As described herein, the mobile device 502 may include one or more computer-executable instructions, such as those illustrated as modules in FIG. 7, to allow the mobile device 502 to open potentially malignant content (e.g., open/execute email attachment, URL in an e-mail, URI to an application for download/install from an application store) in a disposable (e.g., one-time use, temporary, etc.), quarantined (e.g., limited network/resource connectivity, etc.), separate (e.g., physically different device, etc.) execution environment. Moreover, these modules may be located, as appropriate, in the managed 510 and/or unmanaged 512 portion of the mobile device 502 illustrated in the enterprise mobility technical architecture 500.

The enterprise may choose to implement policies to manage the mobile device 504. The policies may be implanted through a firewall or gateway in such a way that the mobile device may be identified, secured or security verified, and provided selective or full access to the enterprise resources. The policies may be mobile device management policies, mobile application management policies, mobile data management policies, or some combination of mobile device, application, and data management policies. A mobile device 504 that is managed through the application of mobile device management policies may be referred to as an enrolled device or as a managed device.

In some embodiments, the operating system of the mobile device may be separated into a managed partition 510 and an unmanaged partition 512. The managed partition 510 may have policies applied to it to secure the applications running on and data stored in the managed partition. In other embodiments, all applications may execute in accordance with a set of one or more policy files received separate from the application, and which define one or more security parameters, features, resource restrictions, and/or other access controls that are enforced by the mobile device management system when that application is executing on the device. By operating in accordance with their respective policy file(s), each application may be allowed or restricted from communications with one or more other applications and/or resources, thereby creating a virtual partition. Thus, as used herein, a partition may refer to a physically partitioned portion of memory (physical partition), a logically partitioned portion of memory (logical partition), and/or a virtual partition created as a result of enforcement of one or more policies and/or policy files across multiple apps as described herein (virtual partition). Stated differently, by enforcing policies on managed apps, those apps may be restricted to only be able to communicate with other managed apps and trusted enterprise resources, thereby creating a virtual partition that is impenetrable by unmanaged apps and devices.

The applications running on the managed partition may be secure applications. The secure applications may be email applications, web browsing applications, software-as-a-service (SaaS) access applications, Windows Application access applications, and the like. The secure applications may be secure native applications 514, secure remote applications 522 executed by a secure application launcher 518, virtualization applications 526 executed by a secure application launcher 518, and the like. The secure native applications 514 may be wrapped by a secure application wrapper 520. The secure application wrapper 520 may include integrated policies that are executed on the mobile device 502 when the secure native application is executed on the device. The secure application wrapper 520 may include meta-data that points the secure native application 514 running on the mobile device 502 to the resources hosted at the enterprise that the secure native application 514 may require to complete the task requested upon execution of the secure native application 514. The secure remote applications 522 executed by a secure application launcher 518 may be executed within the secure application launcher application 518. The virtualization applications 526 executed by a secure application launcher 518 may utilize resources on the mobile device 502, at the enterprise resources 504, and the like. The resources used on the mobile device 502 by the virtualization applications 526 executed by a secure application launcher 518 may include user interaction resources, processing resources, and the like. The user interaction resources may be used to collect and transmit keyboard input, mouse input, camera input, tactile input, audio input, visual input, gesture input, and the like. The processing resources may be used to present a user interface, process data received from the enterprise resources 504, and the like. The resources used at the enterprise resources 504 by the virtualization applications 526 executed by a secure application launcher 518 may include user interface generation resources, processing resources, and the like. The user interface generation resources may be used to assemble a user interface, modify a user interface, refresh a user interface, and the like. The processing resources may be used to create information, read information, update information, delete information, and the like. For example, the virtualization application may record user interactions associated with a GUI and communicate them to a server application where the server application will use the user interaction data as an input to the application operating on the server. In this arrangement, an enterprise may elect to maintain the application on the server side as well as data, files, etc. associated with the application. While an enterprise may elect to "mobilize" some applications in accordance with the principles herein by securing them for deployment on the mobile device, this arrangement may also be elected for certain applications. For example, while some applications may be secured for use on the mobile device, others may not be prepared or appropriate for deployment on the mobile device so the enterprise may elect to provide the mobile user access to the unprepared applications through virtualization techniques. As another example, the enterprise may have large complex applications with large and complex data sets (e.g. material resource planning applications) where it would be very difficult, or otherwise undesirable, to customize the application for the mobile device so the enterprise may elect to provide access to the application through virtualization techniques. As yet another example, the enterprise may have an application that maintains highly secured data (e.g. human resources data, customer data, engineering data) that may be deemed by the enterprise as too sensitive for even the secured mobile environment so the enterprise may elect to use virtualization techniques to permit mobile access to such applications and data. An enterprise may elect to provide both fully secured and fully functional applications on the mobile device as well as a virtualization application to allow access to applications that are deemed more properly operated on the server side. In an embodiment, the virtualization application may store some data, files, etc. on the mobile phone in one of the secure storage locations. An enterprise, for example, may elect to allow certain information to be stored on the phone while not permitting other information.

In connection with the virtualization application, as described herein, the mobile device may have a virtualization application that is designed to present GUI's and then record user interactions with the GUI. The application may communicate the user interactions to the server side to be used by the server side application as user interactions with the application. In response, the application on the server side may transmit back to the mobile device a new GUI. For example, the new GUI may be a static page, a dynamic page, an animation, or the like.

The secure applications may access data stored in a secure data container 528 in the managed partition 510 of the mobile device. The data secured in the secure data container may be accessed by the secure wrapped applications 514, applications executed by a secure application launcher 518, virtualization applications 526 executed by a secure application launcher 518, and the like. The data stored in the secure data container 528 may include files, databases, and the like. The data stored in the secure data container 528 may include data restricted to a specific secure application 530, shared among secure applications 532, and the like. Data restricted to a secure application may include secure general data 534 and highly secure data 538. Secure general data may use a strong form of encryption such as AES 128-bit encryption or the like, while highly secure data 538 may use a very strong form of encryption such as AES 254-bit encryption. Data stored in the secure data container 528 may be deleted from the device upon receipt of a command from the device manager 524. The secure applications may have a dual-mode option 540. The dual mode option 540 may present the user with an option to operate the secured application in an unsecured mode. In an unsecured mode, the secure applications may access data stored in an unsecured data container 542 on the unmanaged partition 512 of the mobile device 502. The data stored in an unsecured data container may be personal data 544. The data stored in an unsecured data container 542 may also be accessed by unsecured applications 548 that are running on the unmanaged partition 512 of the mobile device 502. The data stored in an unsecured data container 542 may remain on the mobile device 502 when the data stored in the secure data container 528 is deleted from the mobile device 502. An enterprise may want to delete from the mobile device selected or all data, files, and/or applications owned, licensed or controlled by the enterprise (enterprise data) while leaving or otherwise preserving personal data, files, and/or applications owned, licensed or controlled by the user (personal data). This operation may be referred to as a selective wipe. With the enterprise and personal data arranged in accordance to the aspects described herein, an enterprise may perform a selective wipe.

The mobile device may connect to enterprise resources 504 and enterprise services 508 at an enterprise, to the public Internet 548, and the like. The mobile device may connect to enterprise resources 504 and enterprise services 508 through virtual private network connections. The virtual private network connections (also referred to as microVPN or application-specific VPN) may be specific to particular applications 550, particular devices, particular secured areas on the mobile device, and the like (e.g., 552). For example, each of the wrapped applications in the secured area of the phone may access enterprise resources through an application specific VPN such that access to the VPN would be granted based on attributes associated with the application, possibly in conjunction with user or device attribute information. The virtual private network connections may carry Microsoft Exchange traffic, Microsoft Active Directory traffic, HTTP traffic, HTTPS traffic, application management traffic, and the like. The virtual private network connections may support and enable single-sign-on authentication processes 554. The single-sign-on processes may allow a user to provide a single set of authentication credentials, which are then verified by an authentication service 558. The authentication service 558 may then grant to the user access to multiple enterprise resources 504, without requiring the user to provide authentication credentials to each individual enterprise resource 504.

The virtual private network connections may be established and managed by an access gateway 560. The access gateway 560 may include performance enhancement features that manage, accelerate, and improve the delivery of enterprise resources 504 to the mobile device 502. The access gateway may also re-route traffic from the mobile device 502 to the public Internet 548, enabling the mobile device 502 to access publicly available and unsecured applications that run on the public Internet 548. The mobile device may connect to the access gateway via a transport network 562. The transport network 562 may be a wired network, wireless network, cloud network, local area network, metropolitan area network, wide area network, public network, private network, and the like.

The enterprise resources 504 may include email servers, file sharing servers, SaaS applications, Web application servers, Windows application servers, and the like. Email servers may include Exchange servers, Lotus Notes servers, and the like. File sharing servers may include ShareFile servers, and the like. SaaS applications may include Salesforce, and the like. Windows application servers may include any application server that is built to provide applications that are intended to run on a local Windows operating system, and the like. The enterprise resources 504 may be premise-based resources, cloud based resources, and the like. The enterprise resources 504 may be accessed by the mobile device 502 directly or through the access gateway 560. The enterprise resources 504 may be accessed by the mobile device 502 via a transport network 562. The transport network 562 may be a wired network, wireless network, cloud network, local area network, metropolitan area network, wide area network, public network, private network, and the like.

The enterprise services 508 may include authentication services 558, threat detection services 564, device manager services 524, file sharing services 568, policy manager services 570, social integration services 572, application controller services 574, and the like. Authentication services 558 may include user authentication services, device authentication services, application authentication services, data authentication services and the like. Authentication services 558 may use certificates. The certificates may be stored on the mobile device 502, by the enterprise resources 504, and the like. The certificates stored on the mobile device 502 may be stored in an encrypted location on the mobile device, the certificate may be temporarily stored on the mobile device 502 for use at the time of authentication, and the like. Threat detection services 564 may include intrusion detection services, unauthorized access attempt detection services, and the like. Unauthorized access attempt detection services may include unauthorized attempts to access devices, applications, data, and the like. Device management services 524 may include configuration, provisioning, security, support, monitoring, reporting, and decommissioning services. File sharing services 568 may include file management services, file storage services, file collaboration services, and the like. Policy manager services 570 may include device policy manager services, application policy manager services, data policy manager services, and the like. Social integration services 572 may include contact integration services, collaboration services, integration with social networks such as Facebook, Twitter, and LinkedIn, and the like. Application controller services 574 may include management services, provisioning services, deployment services, assignment services, revocation services, wrapping services, and the like.

The enterprise mobility technical architecture 500 may include an application store 578. The application store 578 may include unwrapped applications 580, pre-wrapped applications 582, and the like. Applications may be populated in the application store 578 from the application controller 574. The application store 578 may be accessed by the mobile device 502 through the access gateway 560, through the public Internet 548, or the like. The application store may be provided with an intuitive and easy to use user interface. The application store 578 may provide access to a software development kit 584. The software development kit 584 may provide a user the capability to secure applications selected by the user by wrapping the application as described previously in this description. An application that has been wrapped using the software development kit 584 may then be made available to the mobile device 502 by populating it in the application store 578 using the application controller 574.

The enterprise mobility technical architecture 500 may include a management and analytics capability. The management and analytics capability may provide information related to how resources are used, how often resources are used, and the like. Resources may include devices, applications, data, and the like. How resources are used may include which devices download which applications, which applications access which data, and the like. How often resources are used may include how often an application has been downloaded, how many times a specific set of data has been accessed by an application, and the like.

Figure 6:
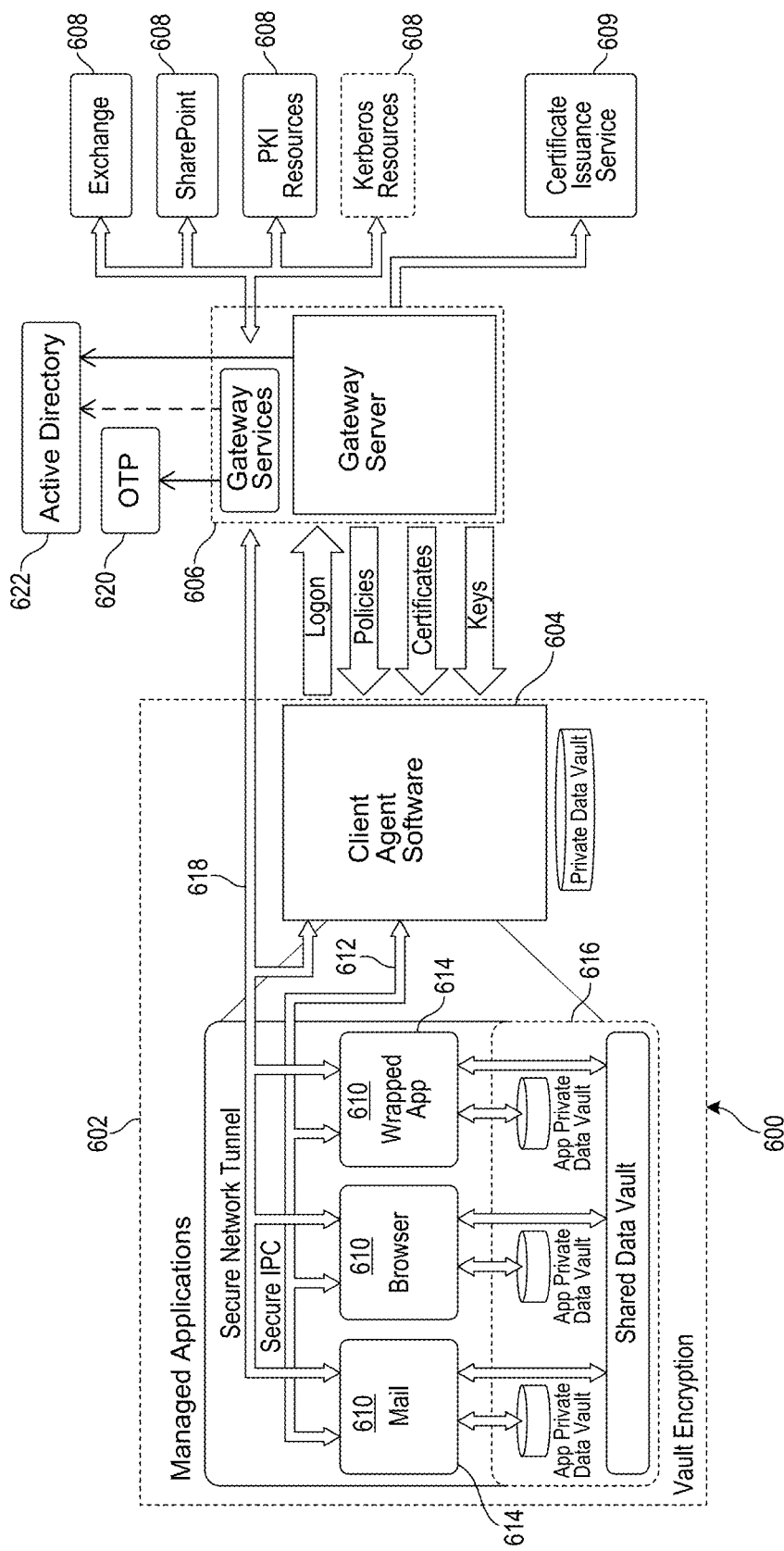
FIG. 6 depicts another illustrative enterprise mobility management system.

FIG. 6 is another illustrative enterprise mobility management system 600. Some of the components of the mobility management system 500 described above with reference to FIG. 5 have been omitted for the sake of simplicity. The architecture of the system 600 depicted in FIG. 6 is similar in many respects to the architecture of the system 500 described above with reference to FIG. 5 and may include additional features not mentioned above. For example, device 602 may include one or more computer-executable instructions, such as those illustrated as modules in FIG. 7, to allow the device 602 to open potentially malignant content (e.g., open/execute email attachment, URL in an e-mail, URI to an application for download/install from an application store) in a disposable, quarantined, separate execution environment in a manner innocuous to the secure, potentially valuable, enterprise resources/services of the enterprise mobile managements system 600.

In this case, the left hand side represents an enrolled/managed mobile device 602 with a client agent 604, which interacts with gateway server 606 (which includes access gateway and application controller functionality) to access various enterprise resources 608 and services 609 such as Exchange, Sharepoint, PKI Resources, Kerberos Resources, and Certificate Issuance Service, as shown on the right hand side above. Although not specifically shown, the mobile device 602 may also interact with an enterprise application store (e.g., StoreFront) for the selection and downloading of applications.

The client agent 604 acts as the UI (user interface) intermediary for Windows apps/desktops hosted in an Enterprise data center, which are accessed using the HDX/ICA display remoting protocol. The client agent 604 also supports the installation and management of native applications on the mobile device 602, such as native iOS or Android applications. For example, the managed applications 610 (mail, browser, wrapped application) shown in the figure above are all native applications that execute locally on the device. Client agent 604 and an application management framework (e.g., mobile experience technology) may act to provide policy driven management capabilities and features such as connectivity and SSO (single sign on) to enterprise resources/services 608. The client agent 604 handles primary user authentication to the enterprise, normally to the access gateway (AG) with SSO to other gateway server components. The client agent 604 obtains policies from gateway server 606 to control the behavior of the managed applications 610 of an application management framework on the mobile device 602.

The secure IPC links 612 between the native applications 610 and client agent 604 represent a management channel, which allows client agent to supply policies to be enforced by the application management framework 614 "wrapping" each application. The IPC channel 612 also allows client agent 604 to supply credential and authentication information that enables connectivity and SSO to enterprise resources 608. Finally the IPC channel 612 allows the application management framework 614 to invoke user interface functions implemented by client agent 604, such as online and offline authentication.

Communications between the client agent 604 and gateway server 606 are essentially an extension of the management channel from the application management framework 614 wrapping each native managed application 610. The application management framework 614 requests policy information from client agent 604, which in turn requests it from gateway server 606. The application management framework 614 requests authentication, and client agent 604 logs into the gateway services part of gateway server 606 (also known as NetScaler Access Gateway). Client agent 604 may also call supporting services on gateway server 606, which may produce input material to derive encryption keys for the local data vaults 616, or provide client certificates which may enable direct authentication to PKI protected resources, as more fully explained below.

In more detail, the application management framework 614 "wraps" each managed application 610. This may be incorporated via an explicit build step, or via a post-build processing step. The application management framework 614 may "pair" with client agent 604 on first launch of an application 610 to initialize the secure IPC channel and obtain the policy for that application. The application management framework 614 may enforce relevant portions of the policy that apply locally, such as the client agent login dependencies and some of the containment policies that restrict how local OS services may be used, or how they may interact with the application 610.

The application management framework 614 may use services provided by client agent 604 over the secure IPC channel 612 to facilitate authentication and internal network access. Key management for the private and shared data vaults 616 (containers) may be also managed by appropriate interactions between the managed applications 610 and client agent 604. Vaults 616 may be available only after online authentication, or may be made available after offline authentication if allowed by policy. First use of vaults 616 may require online authentication, and offline access may be limited to at most the policy refresh period before online authentication is again required.

Network access to internal resources may occur directly from individual managed applications 610 through access gateway 606. The application management framework 614 is responsible for orchestrating the network access on behalf of each application 610. Client agent 604 may facilitate these network connections by providing suitable time limited secondary credentials obtained following online authentication. Multiple modes of network connection may be used, such as reverse web proxy connections and end-to-end VPN-style tunnels 618.

The mail and browser managed applications 610 have special status and may make use of facilities that might not be generally available to arbitrary wrapped applications. For example, the mail application may use a special background network access mechanism that allows it to access Exchange over an extended period of time without requiring a full AD logon. The browser application may use multiple private data vaults to segregate different kinds of data.

This architecture supports the incorporation of various other security features. For example, gateway server 606 (including its gateway services) in some cases will not need to validate AD passwords. It can be left to the discretion of an enterprise whether an AD password is used as an authentication factor for some users in some situations. Different authentication methods may be used if a user is online or offline (i.e., connected or not connected to a network).

Step up authentication is a feature wherein gateway server 606 may identify managed native applications 610 that are allowed to have access to highly classified data requiring strong authentication, and ensure that access to these applications is only permitted after performing appropriate authentication, even if this means a re-authentication is required by the user after a prior weaker level of login.

Another security feature of this solution is the encryption of the data vaults 616 (containers) on the mobile device 602. The vaults 616 may be encrypted so that all on-device data including files, databases, and configurations are protected. For on-line vaults, the keys may be stored on the server (gateway server 606), and for off-line vaults, a local copy of the keys may be protected by a user password. When data is stored locally on the device 602 in the secure container 616, it is preferred that a minimum of AES 256 encryption algorithm be utilized.

Other secure container features may also be implemented. For example, a logging feature may be included, wherein all security events happening inside an application 610 are logged and reported to the backend. Data wiping may be supported, such as if the application 610 detects tampering, associated encryption keys may be written over with random data, leaving no hint on the file system that user data was destroyed. Screenshot protection is another feature, where an application may prevent any data from being stored in screenshots. For example, the key window's hidden property may be set to YES. This may cause whatever content is currently displayed on the screen to be hidden, resulting in a blank screenshot where any content would normally reside.

Local data transfer may be prevented, such as by preventing any data from being locally transferred outside the application container, e.g., by copying it or sending it to an external application. A keyboard cache feature may operate to disable the autocorrect functionality for sensitive text fields. SSL certificate validation may be operable so the application specifically validates the server SSL certificate instead of it being stored in the keychain. An encryption key generation feature may be used such that the key used to encrypt data on the device is generated using a passphrase supplied by the user (if offline access is required). It may be XORed with another key randomly generated and stored on the server side if offline access is not required. Key derivation functions may operate such that keys generated from the user password use KDFs (key derivation functions, notably PBKDF2) rather than creating a cryptographic hash of it. The latter makes a key susceptible to brute force or dictionary attacks.

Further, one or more initialization vectors may be used in encryption methods. An initialization vector will cause multiple copies of the same encrypted data to yield different cipher text output, preventing both replay and cryptanalytic attacks. This will also prevent an attacker from decrypting any data even with a stolen encryption key if the specific initialization vector used to encrypt the data is not known. Further, authentication then decryption may be used, wherein application data is decrypted only after the user has authenticated within the application. Another feature may relate to sensitive data in memory, which may be kept in memory (and not in disk) only when it's needed. For example, login credentials may be wiped from memory after login, and encryption keys and other data inside objective-C instance variables are not stored, as they may be easily referenced. Instead, memory may be manually allocated for these.

An inactivity timeout may be implemented, wherein after a policy-defined period of inactivity, a user session is terminated.

Data leakage from the application management framework 614 may be prevented in other ways. For example, when an application 610 is put in the background, the memory may be cleared after a predetermined (configurable) time period. When backgrounded, a snapshot may be taken of the last displayed screen of the application to fasten the foregrounding process. The screenshot may contain confidential data and hence should be cleared.

Another security feature relates to the use of an OTP (one time password) 620 without the use of an AD (active directory) 622 password for access to one or more applications. In some cases, some users do not know (or are not permitted to know) their AD password, so these users may authenticate using an OTP 620 such as by using a hardware OTP system like SecurID (OTPs may be provided by different vendors also, such as Entrust or Gemalto). In some cases, after a user authenticates with a user ID, a text is sent to the user with an OTP 620. In some cases, this may be implemented only for online use, with a prompt being a single field.

An offline password may be implemented for offline authentication for those applications 610 for which offline use is permitted via enterprise policy. For example, an enterprise may want the enterprise application store to be accessed in this manner. In this case, the client agent 604 may require the user to set a custom offline password and the AD password is not used. Gateway server 606 may provide policies to control and enforce password standards with respect to the minimum length, character class composition, and age of passwords, such as described by the standard Windows Server password complexity requirements, although these requirements may be modified.

Another feature relates to the enablement of a client side certificate for certain applications 610 as secondary credentials (for the purpose of accessing PKI protected web resources via the application management framework micro VPN feature). For example, an application such as @Work-Mail may utilize such a certificate. In this case, certificate-based authentication using ActiveSync protocol may be supported, wherein a certificate from the client agent 604 may be retrieved by gateway server 606 and used in a keychain. Each managed application may have one associated client certificate, identified by a label that is defined in gateway server 606.

Gateway server 606 may interact with an enterprise special purpose web service to support the issuance of client certificates to allow relevant managed applications to authenticate to internal PKI protected resources.

The client agent 604 and the application management framework 614 may be enhanced to support obtaining and using client certificates for authentication to internal PKI protected network resources. More than one certificate may be supported, such as to match various levels of security and/or separation requirements. The certificates may be used by the mail and browser managed applications, and ultimately by arbitrary wrapped applications (provided those applications use web service style communication patterns where it is reasonable for the application management framework to mediate HTTPS requests).

application management framework client certificate support on iOS may rely on importing a PKCS 12 BLOB (Binary Large Object) into the iOS keychain in each managed application for each period of use. application management frameworkclient certificate support may use a HTTPS implementation with private in-memory key storage. The client certificate will never be present in the iOS keychain and will not be persisted except potentially in "online-only" data value that is strongly protected.

Mutual SSL may also be implemented to provide additional security by requiring that a mobile device 602 is authenticated to the enterprise, and vice versa. Virtual smart cards for authentication to gateway server 606 may also be implemented.

Both limited and full Kerberos support may be additional features. The full support feature relates to an ability to do full Kerberos login to AD 622, using an AD password or trusted client certificate, and obtain Kerberos service tickets to respond to HTTP negotiate authentication challenges. The limited support feature relates to constrained delegation in AFEE, where AFEE supports invoking Kerberos protocol transition so it can obtain and use Kerberos service tickets (subject to constrained delegation) in response to HTTP negotiate authentication challenges. This mechanism works in reverse web proxy (a.k.a. CVPN) mode, and when HTTP (but not HTTPS) connections are proxied in VPN and MicroVPN mode.

Another feature relates to application container locking and wiping, which may automatically occur upon jail-break or rooting detections, and occur as a pushed command from administration console, and may include a remote wipe functionality even when an application 610 is not running.

A multi-site architecture or configuration of the enterprise application store and application controller may be supported that allows users to be service from one of several different locations in case of failure.

In some cases, managed applications 610 may be allowed to access a certificate and private key via an API (example OpenSSL). Trusted managed applications 610 of an enterprise may be allowed to perform specific Public Key operations with an application's client certificate and private key. Various use cases may be identified and treated accordingly, such as when an application behaves like a browser and no certificate access is required, when an application reads a certificate for "who am I," when an application uses the certificate to build a secure session token, and when an application uses private keys for digital signing of important data (e.g. transaction log) or for temporary data encryption.

Illustrative Aspects

Figure 7:
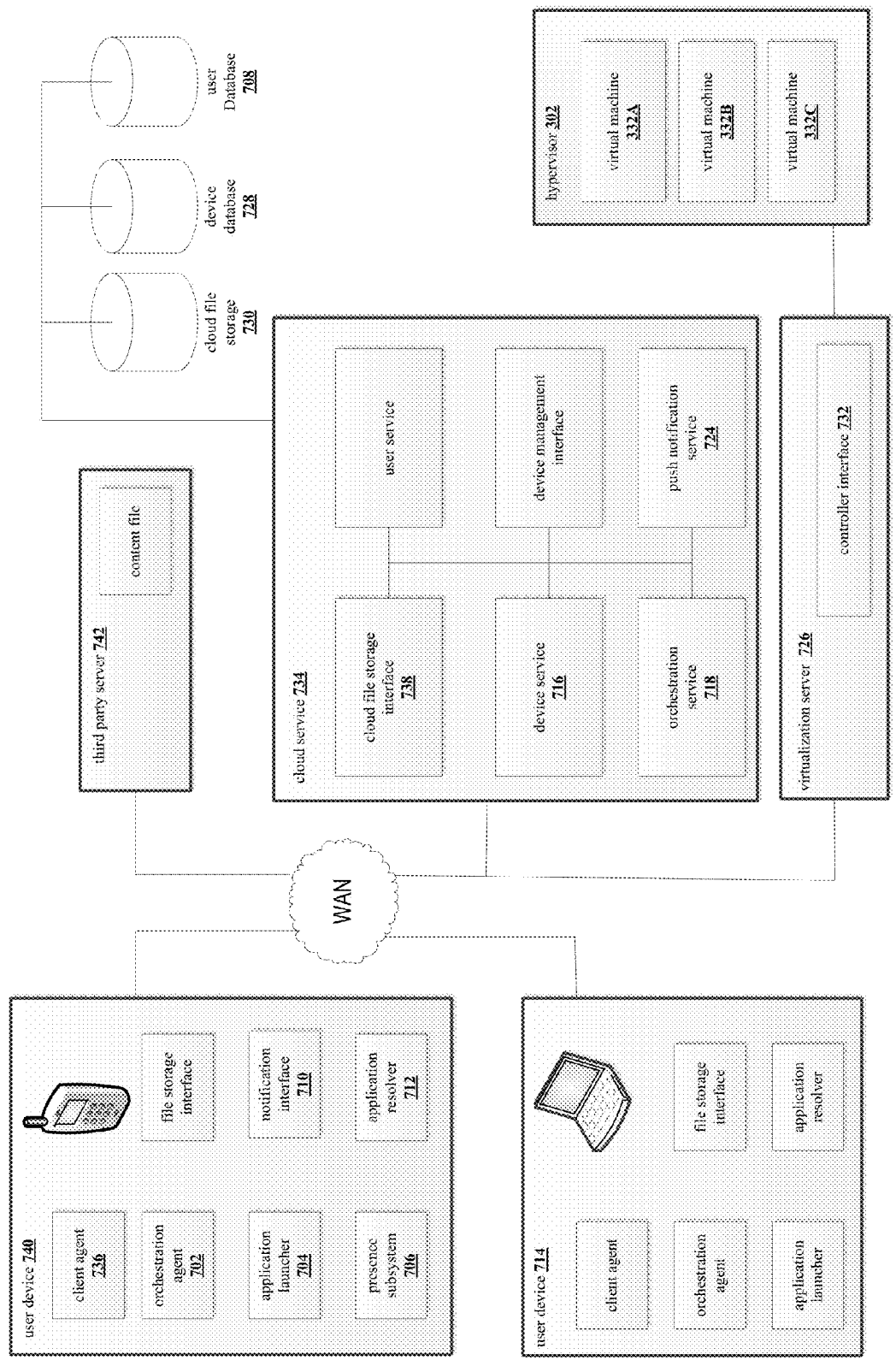
FIG. 7 depicts an illustrative system architecture that may be used in accordance with one or more illustrative aspects described herein.

FIG. 7 depicts an illustrative system architecture according to one or more aspects described herein. The system in FIG. 7 shows a cloud service 734 responsible for one or more server side facilities, and client agent application software 736 running on client devices responsible for intercepting requests to open unverified content in accordance with various aspects disclosed herein. The system of FIG. 7 may include one or more of the following: 1) a cloud service 734, which may provide, inter alia, back-end services desirable by aspects described herein (that may be implemented with use of, e.g., ASP.NET MVC running in Windows Azure); and 2) client devices 740, 714, which may be preconfigured with a client agent 736 and other components/modules 712, 702, 704.

Although the illustrative system architecture of FIG. 7 shows distinct components/modules in the user device 740, cloud service 734, virtualization server 726, and hypervisor 302, the disclosure is not so limited. In some embodiments, the virtualization server 726 and hypervisor 302 may be conflated into cloud service 734. In other embodiments, the hypervisor 302 may be on a physically separate machine, while the virtualization server 726 may be conflated into the cloud service 734. In yet other embodiments, the cloud file storage 730, device database 728, user database 708, and/or other data stores may be conflated into a single database or into the cloud service 734. Nevertheless, the temporary virtual machine 332A may be instantiated in a disposable environment such that it is isolated and/or restricted from accessing outside of particular network components. As a result, even if a content file with malicious code were to be opened by the temporary virtual machine 332A, the act would not infect the user mobile device 740 and/or other system components/devices 714, 734, 726, 728, 742. In yet other embodiments, an intermediate server (e.g., a proxy server) may be positioned between a user device 740 and a 3$^{rd}$ party server (e.g., SMTP e-mail server 742) to intercept and cache a potentially malicious content file. Furthermore, in some embodiments, the orchestration agent 702 and orchestration service 718 may be conflated into a single module. In some examples that single module may reside at the user's mobile device. In other examples that single module may reside on a remote server. At least one benefit of maintaining a separation of the orchestration agent 702 and the orchestration service 718 is because of the added security with isolating the disposable environment of the virtual machine on a device physically separate from the user's device and/or local area network. Moreover, in some examples one or more other components/modules in user device 740 may be conflated or fragmented into one or more components/modules. For example, the functionality of the application resolver 712 and orchestration agent 702 may be conflated into a single component/module. Meanwhile, the functionality of the application launcher 704 may be conflated into that of the application resolver 712.

In some examples, the architecture of FIG. 7 may include one or more client devices 740, 714 which may be preconfigured with a client agent 736 and other components/modules 712, 702, 704, 706, 710. Client components may include an application launcher that launches an appropriate application on the device 740 after data that the application requires to be brought to a device is on the device. Another client component may include a client agent 736 application, such as the CITRIX Receiver™ application, which is readily available. Yet another client component may include an orchestration agent 702 that may be responsible for orchestrating work items related to cross device activity to minimize manual user intervention. For example, if presentation slides are being transferred to the device 740 from another device 742, the orchestration agent 702 ensures that the presentation is available on the device 740, and downloads it to the device 740 if needed. The orchestration agent 702 may receive input from different external sources, such as sensors and clients about when specific events occur that can act as a trigger for different actions to occur, and may act as a rules engine to determine what actions to carry out when a particular event, or trigger, occurs. The orchestration agent 702 may also act as an action generator to translate a sequence of actions that need to occur based on what the resultant actions generated from the rules engine are for a given trigger. The aforementioned rules engines and automation frameworks may include those (and variations on those) disclosed in U.S. Provisional Patent Application Ser. No. 61/824,204, which was previously incorporated by reference herein. The orchestration agent 702 may provide several advantages, including providing the ability to provide future proof behaviors of devices working together collectively, even if they are not explicitly designed to cooperate with each other. Aspects described may also provide the ability to define simple triggers, actions, and behavior rules to give a level of flexibility not available out of the box in other solutions. Aspects also provide the ability to learn system behaviors based upon question and answer style interfaces, and/or by observing how a user uses the system can make customization accessible to users without any programming background. The orchestration agent 702 and other components (e.g., service 718, etc.) may adapt to how users interact with the system, and adjust rules based on user behavior. Thus, the system may learn new interactions and rules, based upon the observed behavior of a user of the system.

Moreover, FIG. 7 may include one or more client components, such as a presence subsystem 706 that ensures that the cloud service 734 is aware that a device 740 is online and available. It may also transfer location information or near-field code (NFC) related information, which may be used by the server 734 to determine if devices are co-located. The presence subsystem 706 of the user device 740 may communicate to the device service 716 of the cloud service 734, to indicate that the user device 740 is available for application launch. The presence subsystem of other devices 714 of the user may also indicate to the device service 716 that the devices are available. As a result, after a request to launch an application is received, the orchestration service 718 may consult with the device service 716 to determine what devices are available for the user. The device service 716 may make use of a device database 728 to determine what devices are associated with a user and the status of those devices. The orchestration service 718 may use a push notification service 724 to send one or more messages to the active devices 740, 714 that the user has registered with the device service 716. A notification interface 710 on the client devices may receive a notification that an application is requested to be launched and may pass this on to the orchestration agent 702, which prompts the user to ask if the user wishes to launch the application. In some embodiments, the user may preconfigure the system with settings (e.g., default settings) that circumvent manually prompting the user in effect providing a seamless, transparent integration.

In addition, FIG. 7 may include one or more client components, such as a cloud file interface that may be responsible for communicating with an underlying data cloud storage provider 730, such as SHAREFILE. Another client component may include an application resolver 712 that may be responsible for determining how to act upon a request to open a potentially malicious content file. For example, if the user wants to make use of a mobile device 740 as a GOTOMEETING video renderer, then the application resolver 712 may determine that the request involves launching a GOTOMEETING application in video output mode only. The application resolver 712 may work out how to actually act upon such a request. Yet another client component may include a notification interface 710 that handles notifications received from the server 734, 726, 302 to engage in various aspects of the disclosure.

The architecture diagram of FIG. 7 further includes one or more server devices 734, 726, 302 which may be preconfigured with components/modules, such as an orchestration service 718 that may be responsible for coordinating the different actions related to making devices display certain content; for example, the orchestration service 718 may include a trigger handler component, rules service component, and/or an action generator component. The orchestration service 718 may act as a central point within the system and may issue instructions to all the other components in the cloud. The server devices may also include a cloud file storage interface 738 to communicate with one or more underlying data cloud storage providers 734, such as DROPBOX, Box, etc. The cloud service 734, in some examples, may further include a device service 716 that may be responsible for maintaining knowledge of the user's devices 740, 714, and the capabilities of each device, such as what kind of device it is, what applications it is capable of running, and what kind of peripherals (such as cameras), that it has available. This information may be stored in a device database 728 or other computer memory. Similarly, a user service and user database 708 may be included in FIG. 7. The user service may be responsible for maintaining knowledge the users of the system and for identity management. The system architecture of FIG. 7 may further include a device management interface that allows users of the system to define what specific roles or actions occur on what specific devices. It allows the user to customize how user devices behave for specific situations, such as GOTOMEETING or what device will display web content. It defers the work of actually sequencing what goes to what device to the orchestration service 718. Meanwhile, push notification service 724 may be responsible for leveraging push notification frameworks that are used by APPLE iOS, ANDROID, WINDOWS, and other services to notify devices that they need to take action.

Moreover, the architecture diagram of FIG. 7 further illustrates one or more additional server devices 726, 302, which may be preconfigured with components/modules, such as a controller interface 732 that may be responsible for, inter alia, facilitating communicating with the virtualization server 726 to cause it to provision and/or destroy temporary virtual machines 332A, 332B, 332C used to handle/open potentially malicious content files. The virtualization server 726 may interact with a hypervisor 302 to instruct the hypervisor to create and destroy temporary virtual machines 332A upon request. The hypervisor 302 may comprise a pool of virtual machines created and available for use upon request. Some virtual machines may be created in a disposable WINDOWS operating environment, while others may be created in an environment of another operating platform (e.g., ANDROID, LINUX, etc.). Moreover, the hypervisor 302 may be on a physically separate machine than the virtualization server 726 in some embodiments, or alternatively, may be executing on the same machine. The hypervisor 302 may be responsible for providing a hosting environment for the temporary virtual machines 332A, 332B that provide the sacrificial execution environment for potential malware. In addition, the virtualization server 726 may broker remote presentation protocol connections between the temporary virtual machine 332A and ultimately the client agent 736 on the user device 740.

Figure 8:
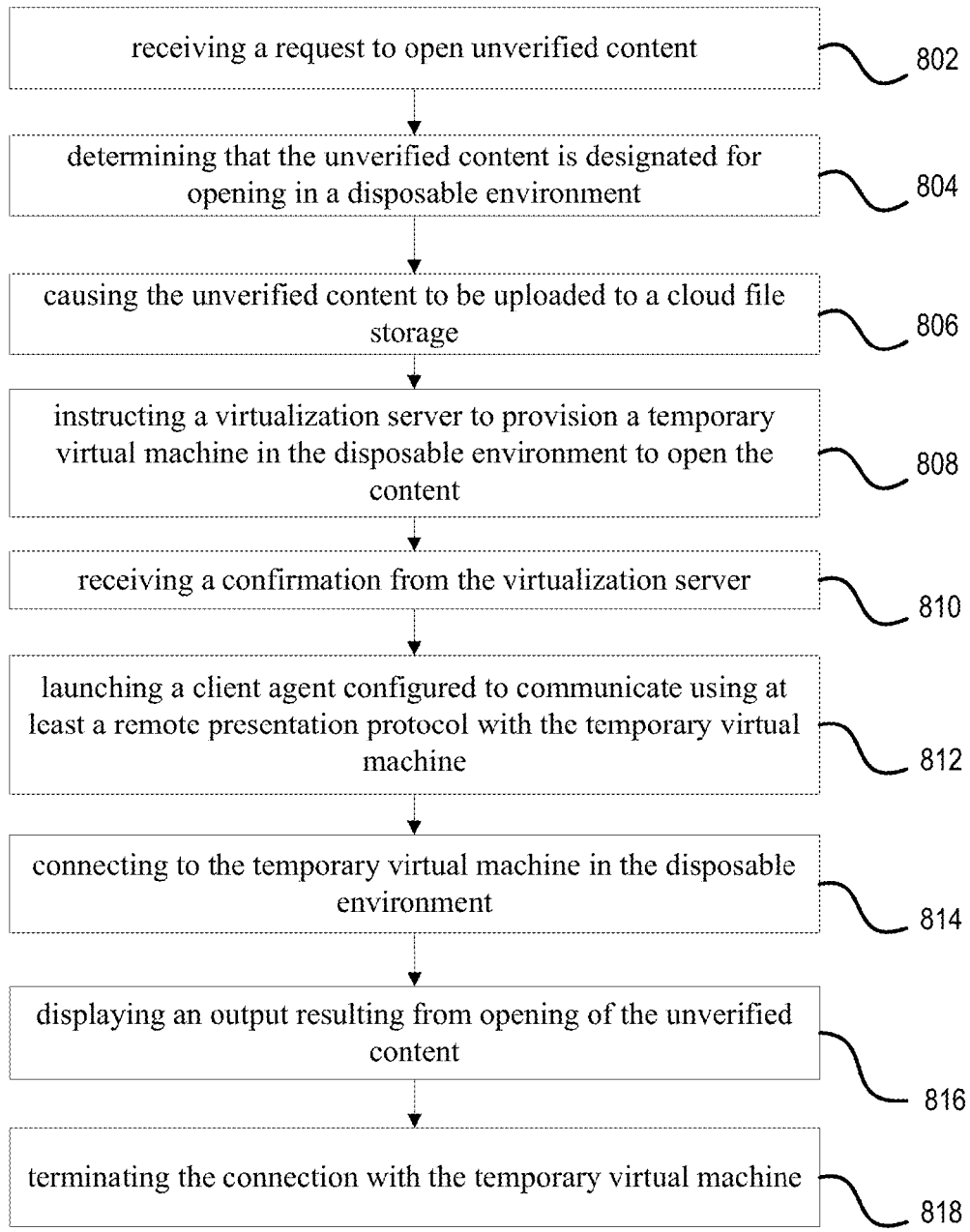
FIG. 8 illustrates a flowchart showing some of the interactions between various modules/components/systems in FIG. 7.

FIG. 8 is an illustrative flowchart showing some of the interactions between various modules/components/systems in FIG. 7 in one example where a user of a computing device (e.g., mobile device 740) attempts to open on the mobile device an attachment potentially containing malware. A user may have various software applications (e.g., e-mail application) installed/executing on his/her device (e.g., a mobile device such as a smartphone, tablet, or other device). While using an e-mail application, the user may receive an e-mail including an e-mail attachment that appears to be a PDF document and wish to open it. The user's device in this example is preconfigured to, without further user involvement, intercept requests to open particular types of documents, such as PDF attachments. For example, on a device running a MICROSOFT WINDOWS operating system, the handler for the PDF document type may be preconfigured to cause requests to open PDF files to be intercepted. In another example, on a device running APPLE's iOS operating system, the corresponding "Open In" handler may be pre-configured to cause requests to open PDF files to be intercepted.

Since the device 740 is preconfigured to intercept requests to open (e.g., access for display, access for execution, access for saving to memory, etc.) particular type(s) of files (e.g., PDF files), when the user selects to open the PDF attachment, an application resolver 712 may intercept the request to launch the PDF file. (See step 802). The application resolver 712 may determine which application and what parameters are needed to launch the particular content file or web link. The application resolver 712 may also determine whether or not to launch the file in a disposable environment in accordance with various aspects of the disclosure. For example, the application resolver 712 may, in one example, determine that a disposable environment is desired because the type of file being requested to be launched is of a particular type. (See step 804). For example, the application resolver 712 may communicate with and compare against a recorded (i.e., stored) table of file types stored in computer memory. The recorded table may, in some examples, list (e.g., a blacklist) the file types that should always be opened in a disposable environment. Alternatively, the recorded table may list (e.g., a whitelist) all file types that are permitted to be opened outside of the construct of a disposable environment. In yet another example, the list may be a hybrid list that identifies different file types and indicates whether or not the file type may be, must be, can never be, or is opened by default in a disposable environment. In yet other examples, the application resolver 712 may establish a different criteria/criterion by which the application resolver 712 determines whether or not to launch the request in a disposable environment: based on a source of the URL/URI of the requested content, based on a security settings of the particular user of the user device (e.g., admin user, novice user, expert user, etc.), based on whether or not the content passes a preliminary virus/malware scan test, or other criteria). The application resolver 712 may comprise computer-executable instruction stored on computer memory, that when executed by a computer processor, cause the aforementioned criteria to be performed. The application resolver 712 may receive particular information (e.g., file type parameters, URL, user access control setting, test results, etc.) in the incoming request that the computer-executable instructions compare against the recorded table or other data structure storing predetermined criterion.

Since the user device 740 is configured with the application resolver 712 to intercept requests to open files that meet particular criterion, a user of the device 740 may seamlessly operate the device 740, in some embodiments, without manual intervention. For example, the execution of the file in a remote, disposable environment on a separate device may be transparent to the user experience. At least one benefit of a seamless integration of the various systems disclosed herein is that a user need not necessarily be aware and cautious of potentially suspicious e-mail attachments and/or website URLs because the application resolver 712 and other system components disclosed herein automatically intervene to create a separate and/or disposable environment for opening the unverified content.

Assuming the application resolvers 712 determines that the file should be launched in a disposable environment, then the application resolver 712 may pass the request to open the file to an orchestration agent 702 that, inter alia, may handle the work of shepherding the content file (e.g., PDF file, .exe executable file, .com command file, .bat batch file, .js Javascript bytecode, object code, or any other content) to the disposable environment (e.g., destination virtual machine in the disposable environment). The orchestration agent 702 may use a file storage interface (e.g., Sharefile interface to upload the PDF file to a networked data store (e.g., a cloud storage solution, ShareFile 730, or other data store) so that the content may be later retrieved by the destination virtual machine in the disposable environment. (See step 806). Once successfully uploaded, the orchestration agent 702 may send a message to an orchestration service 718 located on a remote server (e.g., cloud server to indicate that the file is available and may be opened (e.g., executed, etc.) in the disposable environment.

In another embodiment, the user device 740 may be pre-configured to utilize an intermediate server (e.g., a proxy server) positioned between the user device 740 and a $3^{rd}$ party server (e.g., SMTP e-mail server 742) to intercept and cache the content file to circumvent the step of transferring the content file to/from the user device 740. For example, upon determining that the content file is to be launched in a disposable environment, the orchestration agent 702 may halt the download of the content file to the user device 740. Instead, the orchestration agent 702 may instruct the cloud service 734 (e.g., orchestration service 718) to directly communicate with the intermediate server to shepherd the content file from memory in the intermediate server to the disposable environment. In some examples, the intermediate server may upload the content file to the cloud file storage 730 for later download to the temporary virtual machine 332A. At least some benefits of the approach using an intermediate server is that bandwidth consumption/latency at the user device 740 is reduced, in addition to increased security because potentially malicious content (e.g., unverified content) is completely redirected away from the storage in memory on the user device 740.

The orchestration service 718 may communicate with a controller interface 732, for example, by sending a message to the controller interface 732. The controller interface 732 may be located at a virtualization server (e.g., server 301 comprising management server 410 and other components) configured to provision one or more virtual machines 332 in a disposable environment (e.g., hypervisor 302). In such an example, the virtualization server 301 may include the hypervisor 302, which may be a Type 1 hypervisor, Type 2 hypervisor, or other type of hypervisor. Alternatively, the hypervisor 302 may be located at a physically separate machine than the controller interface 732 on a virtualization server. In such an example, where the hypervisor is a Type 2 hypervisor, the hypervisor 302 may accesses system resources through a host operating system 314. Meanwhile, where the hypervisor is a Type 1 hypervisor, the hypervisor may directly access system resources without need for a host operating system 314.

After receipt of the message at the controller interface 732, the controller interface may send a request from the virtualization server to the hypervisor 302 to cause provisioning of a temporary virtual machine using a known stored image. (See step 808). The hypervisor 302 may load a virtual machine image to create the temporary virtual machine 332. The image may include the necessary components (e.g., software applications, drivers, etc.) to handle opening the appropriate file type (e.g., PDF files) in a disposable environment. In some examples, the hypervisor 302 may have preemptively provisioned a pool of virtual machines (e.g., a predetermined minimum threshold number of virtual machines 332B, 332C) in order to provide a more efficient and/or quicker response to a request to launch a temporary virtual machine. In any case, the hypervisor 302 may select an appropriately provisioned virtual machine 332A and assign it to the user device 740 corresponding to the received request. The hypervisor 302 may select the appropriate virtual machine 332 by identifying any requirements (e.g., requirement to open a particular file type, requirement to play audio/video content, or others) associated with the received request and assigning the user's device 740 a virtual machine 332A that meets those requirements.

Once the controller interface 732 receives a confirmation message from the hypervisor 302 that a particular temporary virtual machine 332A has been assigned to the user's device 740, (see step 810), then the controller interface 732 may provide unique identification information (and other information) about the temporary virtual machine 332A to a device service 716. The device service 716 may comprise memory for storing an association/mapping of the temporary virtual machine with the user's device 740.

With the temporary virtual machine up and running (as an anonymous user, in some embodiments) and registered with the cloud service 734, the virtual machine 332A may request from the cloud service 734 any content applicable. Such content may include the PDF attachment the user desires to open on the user device 740, or other content. The orchestration service 718 may facilitate transfer of the content to the temporary virtual machine 332A by, for example, sending it a link to the PDF file previously uploaded into the cloud file storage 730. As a result, the virtual machine 332A may retrieve/receive the file/content from the cloud file storage 730.

With the temporary virtual machine 332A in the disposable environment in a ready state, the cloud service 734 may use a push notification service 724 to send a message (e.g., a push notification) to the user device 740 to, for example, wake it up from a possible sleep/wait mode. The message may be received by a notification service 710 located at the user device 740. The notification service 710 may process the message, which may contain, in some examples, information about how the user device 740 may connect via a remote presentation protocol (e.g., CITRIX HDX protocol) to the virtualization server (e.g., via the cloud service 734). In some embodiments, the orchestration agent 702 may retrieve connection information (e.g., information about how the user device 740 may connect via a remote presentation protocol to the virtualization server) from an orchestration service 718 at the cloud service 734. In any case, the connection information may be used to start a remote presentation protocol session using the client agent 736. The connection may be through a (wired or wireless) network interface (not shown in FIG. 7) on the user device.

In one example, the orchestration agent 702 may determine that the client agent 736 should be started and passes the connection information to the application resolver 712 to cause the application launcher 704 (e.g., secure application launcher 518) to launch the client agent 736. (See step 812). The client agent 736 may use the connection information to connect to the temporary virtual machine 332A in the disposable environment. (See step 814). As a result, the user device 740 may be connected via a remote presentation protocol to the temporary virtual machine 332A and may be configured to display (e.g., show images/video and/or output audio via speakers) on the user device's 740 display screen (and/or on the user device's 740 speakers) the output of the temporary virtual machine 332A. (See step 816).

With the client agent application 736 connected via a remote presentation protocol to the virtualization server, the temporary virtual machine 332A may launch the PDF content using the appropriate application software. Assuming malware or other malicious content is present in the PDF content, the malware may attempt to embed itself in the operating system of the disposable environment. For example, the malware may attempt to modify system registry files, manipulate critical system files, embed monitoring code onto the device, and/or other nefarious acts. However, since the disposable environment may be configured with limited privileges and restricted network access, the malware is limited in its ability to spread outside the confines of the disposable environment (e.g., the malware is limited in its ability to travel to other machines). In some examples, the PDF content may execute in the background without outputting any useful display or sounds. As such, upon seeing no useful output, the user of the mobile device 740 may request to exit the request to open the PDF file.

The request to exit may be received by the client agent 736 and cause the cloud service 734 to initiate the process of, inter alia, shutting down the temporary virtual machine 332A. (See step 818). The orchestration service 718 may be notified that the remote presentation protocol session has ended and cause it to orchestrate destruction of the disposable environment. In such a one-time use configuration, for example, the device service 716 may be instructed to unregister the temporary virtual machine 332A, including removing the association of the user mobile device 740 with that particular temporary virtual machine. Furthermore, the cloud file storage interface 738 may be instructed to delete the PDF content. In addition, the controller interface 732 may be immediately instructed to destroy the temporary virtual machine 332A. The hypervisor 302 may then immediately destroy the disposable environment instantiated for the temporary virtual machine 332A. As a result, the entirety of the disposable environment may be destroyed and any threat posed by the malware ceases to exist. In some embodiments, the controller interface 732 might not be immediately instructed to destroy the temporary virtual machine 332A; instead the temporary virtual machine 332A may be permitted to exist for a predetermined amount of time, such as until a triggering event such as the user device restarting, or until a predetermined amount of time (e.g., 1 hour, 24 hours, 30 minutes, etc.) has passed.

Moreover, as an additional safety measure, the machine hosting the hypervisor 302 may be wiped clean to ensure that the entirety of any malicious code has been destroyed from the disposable environment. While sandbox technologies exist, such as in APPLE iOS, ANDROID, BROMIUM, and APP-V, these existing technologies operate within one device, thus failing to appreciate the benefits associated with opening unverified content files/executables on another, physically separate device in a disposable environment. Aspects of the aforementioned system may be referenced as a cross-device sandbox. For example, if a piece of malware breaks outside of the temporary virtual machine 332A and executes in the hypervisor host 302, the host machine may be compromised. As a result, the system may configured to periodically (e.g., daily, weekly, monthly, after a predetermined number of temporary virtual machines have been instantiated, etc.) shutdown the hypervisor 302, wipe clean the machine hosting the hypervisor 302, and re-install a fresh hypervisor 302 from a known base image. Such a configuration has numerous benefits over existing sandboxing technologies, including protecting a user device 740 from unverified content even when the user device does not have a sandbox native to the device operating system. For example, the user device 740 might not need a sandbox native to the device operating system, such as in some prior art systems, to protect the user device from the unverified content. In addition, in various aspects of the disclosure, the user device 740 not have anti-virus software installed on the user device 740.

In some embodiments, before destroying the disposable environment, the resulting image of the disposable environment may be compared to the original image of the disposable environment when it was first instantiated. The orchestration service 718 may request the controller interface 732 to capture the resulting image and run a comparison against the original image stored, for example, at the hypervisor 302. The output of the comparison may find that the potential malware in the PDF content was innocuous. Alternatively, the comparison may find that the malware in the PDF content was malicious and caused to modify system registry files, manipulate critical system files, embed monitoring code onto the device, and/or other nefarious acts. Information about the malware may be collected, organized, and transmitted to, for example, a database (e.g., third-party database) of known malware. Such a database may belong to or be communicated to an anti-virus solution provider, such as McAFEE™ or others, in order to enhance malware protection of other devices that may also attempt to open the malicious file. The aforementioned information may include the name of the malicious file, an image of the malicious file or portion of the file (e.g., for comparison purposes), a list of those items (e.g., system settings, system files, etc.) the malware exploits/modifies, and other information known to be collected about malware by persons having ordinary skill in the anti-virus solution provider industry.

Although the preceding example assumes a scenario where the subject file contains malicious content, in some examples the subject file to be opened (i.e., accessed for display, execution, or some other operation) at the user's mobile device 740 might not contain malware. In some examples in the aforementioned scenario, the use of a disposable environment may be seamlessly integrated with the opening of the content file such that once the content file is determined to be benign, the opening of the content file may be transferred from the disposable environment to the user device 740. For example, once a PDF file is determined to be benign, the PDF file may be opened by the local device 740 and automatically scrolled to the same page currently displayed. The graphical user interface (GUI) generated (via remote presentation protocol) by the temporary virtual machine 332A in the disposable environment may be transparently replaced in a seamless manner with the locally-generated GUI. In addition, any application settings/parameters of the application executing the content file in the disposable environment may be seamlessly transferred to that of the corresponding application at the user device 740. As such, the execution of the content file may be transitioned from a quarantined, separate disposable environment on a remote device (e.g., virtualization server) to a local environment (e.g., user device 740). Moreover, in some embodiments, the transitioning between devices may use aspects of transportation and selection mechanisms disclosed in commonly-assigned U.S. Provisional Patent Application Ser. No. 61/824,204, which was previously incorporated by reference in its entirety herein. Aspects of that transportation and selection mechanism(s) may provide the ability to efficiently spread/transfer activities across/between devices by reducing the friction caused by applications, data, and context being locked into devices. Other aspects provide the ability to share world knowledge/state between devices to enhance the user experience, effectively alleviating redundant entry of information. In addition, additional aspects disclose client agent 736 software that may assist in migrating virtualized applications from one device to another device. This may be performed using, for example, push-driven "smooth roaming " Other aspects of the client agent 736 may provide for the ability to share the state of web browser sessions across devices, and simplify the use of multiple devices by reducing manual configuration and coordination. While cross device sharing frameworks, such as that offered by GOOGLE CHROME, AIRPLAY and MICROSOFT XBOX SMART GLASS, exist, these frameworks are deficient in providing security or protection against malware.

While execution of the content file may be seamlessly transferred in the above example, in some examples it may be desirable for the transfer of the execution to not be seamless in that the user device 740 may prompt the user about the transfer before performing the transfer. As a result, the user may have more runtime control over the execution of a content file containing potentially malicious code.

Although various examples throughout the disclosure refer to illustrative PDF content, the spirit of the disclosure is not so limited. As explained above, the content file may be any of numerous file types or information, including, but not limited to a PDF file, .exe executable file, .com command file, .bat batch file, image file, audio file, video file, HTML content, XML content, .js Javascript bytecode, object code, or any other content type.

As will be appreciated by one of skill in the art after review of the entirety disclosed herein, various aspects described herein may be embodied as a method, a data processing system, or a computer program product. Accordingly, those aspects may take the form of an entirely hardware embodiment, an entirely software embodiment or an embodiment combining software and hardware aspects. Furthermore, such aspects may take the form of a computer program product stored by one or more computer-readable storage media having computer-readable program code, or instructions, embodied in or on the storage media. Any suitable computer readable storage media may be utilized, including hard disks, CD-ROMs, optical storage devices, magnetic storage devices, and/or any combination thereof In addition, various signals representing data or events as described herein may be transferred between a source and a destination in the form of electromagnetic waves traveling through signal-conducting media such as metal wires, optical fibers, and/or wireless transmission media (e.g., air and/or space).

Aspects of the disclosure have been described in terms of illustrative embodiments thereof. Numerous other embodiments, modifications, and variations within the scope and spirit of the appended claims will occur to persons of ordinary skill in the art from a review of this disclosure. For example, one of ordinary skill in the art after review of the entirety disclosed herein will appreciate that the steps described and/or illustrated herein may be performed in other than the recited order, and that one or more steps illustrated may be optional in accordance with aspects of the disclosure. Modifications may be made, particularly in light of the foregoing teachings. For example, each of the elements of the aforementioned embodiments may be utilized alone or in combination or sub-combination with elements of the other embodiments. It will also be appreciated and understood that modifications may be made without departing from the spirit and scope of the aspects described herein. Although the subject matter has been described in language specific to structural features and/or methodological acts, it is to be understood that the subject matter defined in the appended claims is not necessarily limited to the specific features or acts described above. Rather, the specific features and acts described above are described as example implementations of the following claims.

What is claimed is:

1. A method comprising:
   intercepting, on a client device, a request to open unverified content;
   determining, by an application resolver without user intervention, that the unverified content is designated for opening in a disposable environment;
   causing the unverified content to be uploaded to a cloud file storage;
   causing a virtualization server to:
      provision a temporary virtual machine in the disposable environment;
      download the unverified content to a storage allocated to the temporary virtual machine; and
      open the downloaded unverified content using the storage allocated to the temporary virtual machine;
   receiving, by the client device and from the virtualization server, a confirmation that the temporary virtual machine is ready to connect;
   launching, on the client device, a client agent configured to communicate via a remote presentation protocol with the temporary virtual machine;
   connecting, by the client agent, to the temporary virtual machine in the disposable environment;
   displaying, by the client agent and on the client device, an output resulting from the opening of the unverified content using the storage allocated to the temporary virtual machine;
   responsive to a determination that the unverified content is benign:
      receiving, by the client device, display configuration information associated with the opened unverified content at the temporary virtual machine, wherein the display configuration information indicates a currently displayed portion of the unverified content;
      downloading, by the client device, the unverified content;
      opening the unverified content at the client device;
      modifying a display configuration of the opened unverified content at the client device using the received display configuration information to display the currently displayed portion of the unverified content;
      switching automatically the display, on the client device, from the output resulting from the opening of the unverified content at the temporary virtual machine to the opened unverified content at the client device; and
      terminating the connection with the temporary virtual machine.

2. The method of claim 1, wherein the intercepting the request to open the unverified content comprises:
   registering, on the client device, the application resolver as a handler for a particular file type; and
   receiving, on the client device, the request to open the unverified content, wherein a file type of the unverified content meets the particular file type.

3. The method of claim 1, wherein the determining that the unverified content is designated for opening in the disposable environment comprises:
   comparing a file type of the unverified content against a stored list of file types, wherein the stored list of file types indicates different file types and indicates whether each file type in the stored list of file types is to be opened in the disposable environment; and
   determining, based on the comparing, whether the unverified content is designated for opening in the disposable environment.

4. The method of claim 1, wherein the determination that the unverified content is benign comprises:
   capturing an image of the temporary virtual machine;
   comparing the captured image of the temporary virtual machine to an original image of the temporary virtual machine before the opening of the unverified content in the temporary virtual machine; and
   determining, based on the comparing, whether the unverified content is benign.

5. The method of claim 1, further comprising:
   responsive to a determination that the unverified content is malicious:
      causing the virtualization server to destroy the temporary virtual machine;
      deleting the unverified content in the cloud file storage; and
      preventing the client device from opening the unverified content.

6. The method of claim 1, wherein the receiving the confirmation comprises:
   receiving, by a notification service on the client device and from the virtualization server, a push notification indicating that the temporary virtual machine is ready to connect, wherein the push notification comprises connection information for the client device to connect to the temporary virtual machine via the remote presentation protocol; and
   waking, the client device, from a sleep mode in response to receiving the push notification.

7. The method of claim 1, wherein causing the virtualization server to provision the temporary virtual machine in the disposable environment further comprises:
  sending, to the virtualization server, a link to the unverified content uploaded to the cloud file storage; and
  causing the temporary virtual machine to retrieve the unverified content from the cloud file storage.

8. The method of claim 1, wherein the causing the unverified content to be uploaded to the cloud file storage comprises:
  caching the unverified content in an intermediate server between the client device and a third party server;
  preventing downloading of the unverified content to the client device; and
  sending, from the intermediate server and to the cloud file storage, the unverified content.

9. The method of claim 1, wherein the unverified content is determined to be benign based on the unverified content not modifying one or more system registry files of the temporary virtual machine and not embedding monitoring code on the temporary virtual machine.

10. A system comprising:
  a display monitor;
  a network interface;
  a computer processor; and
  a tangible computer memory storing computer-executable instructions that, when executed by the computer processor, cause the system to:
    intercept a request to open unverified content from a remote e-mail server;
    determine, by an application resolver, that the unverified content is designated for opening in a disposable environment, wherein the application resolver is registered as a handler for the unverified content that meets particular criterion;
    cause the unverified content to be uploaded to a cloud file storage;
    cause a virtualization server to:
      provision a temporary virtual machine in the disposable environment;
      download the unverified content to a storage allocated to the temporary virtual machine; and
      open the downloaded unverified content using the storage allocated to the temporary virtual machine;
    receive a confirmation from the virtualization server that the temporary virtual machine in the disposable environment is ready to connect;
    launch a client agent configured to communicate through the network interface using at least a remote presentation protocol with the temporary virtual machine;
    connect, through the network interface using the client agent, to the temporary virtual machine in the disposable environment;
    display, on the display monitor, an output resulting from the opening of the unverified content using the storage allocated to the temporary virtual machine;
    responsive to a determination that the unverified content is benign:
      receive display configuration information associated with the opened unverified content at the temporary virtual machine, wherein the display configuration information indicates a currently displayed portion of the unverified content;
      download, by the client agent, the unverified content;
      open, by the client agent, the unverified content;
      modifying a display configuration of the opened unverified content using the received display configuration information to display the currently displayed portion of the unverified content; and
      switch automatically the display, on the display monitor, from the output resulting from the opening of the unverified content at the temporary virtual machine to the opened unverified content;
    terminate a connection with the temporary virtual machine in the disposable environment;
    cause the virtualization server to destroy the temporary virtual machine and the disposable environment; and
    cause the virtualization server to delete the unverified content in the cloud file storage.

11. The system of claim 10, wherein a first machine installed with a hypervisor associated with the virtualization server is periodically rebooted and re-imaged with a base image to ensure the hypervisor is cleaned of any malicious content.

12. The system of claim 10, further comprising:
  an intermediate server positioned between the computer processor and the remote e-mail server, wherein the intermediate server is configured to cache the unverified content and transmit the cached unverified content to the cloud file storage.

13. The system of claim 10, wherein the determination that the unverified content is benign comprises:
  capturing an image of the temporary virtual machine;
  comparing the captured image of the temporary virtual machine to an original image of the temporary virtual machine before the opening of the unverified content in the temporary virtual machine; and
  determining, based on the comparing, whether the unverified content is benign.

14. The system of claim 10, wherein the tangible computer memory further stores computer-executable instructions that, when executed by the computer processor, further cause the system to:
  responsive to a determination that the unverified content is malicious:
    causing the virtualization server to destroy the temporary virtual machine;
    deleting the unverified content in the cloud file storage; and
    preventing the opening of the unverified content.

15. A system comprising:
  a network interface;
  a computer processor; and
  a tangible computer memory storing computer-executable instructions that, when executed by the computer processor, cause the system to:
    receive a request to open unverified content;
    cause the unverified content to be downloaded to the tangible computer memory;
    provision a temporary virtual machine in a disposable environment;
    send a confirmation to a user device that the temporary virtual machine in the disposable environment is ready to connect;
    connect the temporary virtual machine in the disposable environment through the network interface to the user device using at least a remote presentation protocol;
    open the downloaded unverified content in the temporary virtual machine in the disposable environment;

cause a display, at the user device, of an output resulting from the opening of the downloaded unverified content at the temporary virtual machine in the disposable environment;

determine that the downloaded unverified content is benign based on a comparison of an image of the disposable environment with an original image of the disposable environment before the opening of the downloaded unverified content in the disposable environment;

responsive to the determining that the downloaded unverified content is benign:

transmit, to the user device, display configuration information associated with the opened downloaded unverified content at the temporary virtual machine in the disposable environment, wherein the display configuration information indicates a currently displayed portion of the unverified content; and cause the display, at the user device, to switch automatically from the output resulting from the opening of the downloaded unverified content at the temporary virtual machine in the disposable environment to a display of the currently displayed portion of the unverified content local to the user device by causing the unverified content to be opened at the user device using the transmitted display configuration information;

terminate the connection between the temporary virtual machine and the user device;

cause the temporary virtual machine to be destroyed; and delete the downloaded unverified content in the tangible computer memory.

16. The system of claim 15, further comprising a hypervisor with a pool of preemptively provisioned virtual machines, and wherein the provisioning of the temporary virtual machine in the disposable environment further comprises selecting a virtual machine from the pool of preemptively provisioned virtual machines based on the downloaded unverified content.

17. The system of claim 16, wherein a first machine installed with the hypervisor is periodically rebooted and re-imaged with a base image to ensure the hypervisor is cleaned of any malicious content.

18. The system of claim 15, wherein the causing the unverified content to be downloaded to the tangible computer memory comprises:

caching the unverified content in an intermediate server between the user device and a remote server;

preventing downloading of the unverified content to the user device; and retrieving, from the intermediate server, the unverified content.

19. The system of claim 15, wherein the sending the confirmation to the user device that the temporary virtual machine in the disposable environment is ready to connect comprises:

sending, to the user device, a push notification indicating that the temporary virtual machine is ready to connect, wherein the push notification comprises connection information for the user device to connect to the temporary virtual machine via the remote presentation protocol; and causing, the user device, to wake from a sleep mode in response to receiving the push notification.

* * * * *